United States Patent
Rahman et al.

(10) Patent No.: US 11,502,801 B2
(45) Date of Patent: Nov. 15, 2022

(54) ADAPTATION OF ON/OFF MASK FOR NR WITH DIFFERENT NUMEROLOGIES

(71) Applicant: Telefonaktiebolaget LM Ericsson (publ), Stockholm (SE)

(72) Inventors: Imadur Rahman, Sollentuna (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 272 days.

(21) Appl. No.: 16/306,919

(22) PCT Filed: Jun. 19, 2018

(86) PCT No.: PCT/SE2018/050645
§ 371 (c)(1),
(2) Date: Dec. 4, 2018

(87) PCT Pub. No.: WO2018/236276
PCT Pub. Date: Dec. 27, 2018

(65) Prior Publication Data
US 2020/0366438 A1 Nov. 19, 2020

Related U.S. Application Data

(60) Provisional application No. 62/521,572, filed on Jun. 19, 2017.

(51) Int. Cl.
*H04L 5/00* (2006.01)
*H04L 27/26* (2006.01)

(52) U.S. Cl.
CPC .......... *H04L 5/0051* (2013.01); *H04L 5/0007* (2013.01); *H04L 5/0044* (2013.01); *H04L 5/0053* (2013.01); *H04L 27/2602* (2013.01)

(58) Field of Classification Search
CPC . H04L 5/0051; H04L 5/0053; H04L 27/2602; H04L 5/0044; H04L 5/0007
See application file for complete search history.

(56) References Cited

U.S. PATENT DOCUMENTS 6,317,235 B1 * 11/2001 Hamilton ............... H04B 10/40
398/9
2017/0048038 A1 * 2/2017 Seo ........................ H04L 5/0082
(Continued)

FOREIGN PATENT DOCUMENTS

WO WO-2018058398 A1 * 4/2018 ......... H04L 27/2602
WO 2018143856 A1 8/2018

OTHER PUBLICATIONS

Catt, "Discussion on time mask for NR UE", 3GPP TSG-RAN WG4 Meeting #83, Hangzhou, China, May 15, 2017, pp. 1-2, R4-1704918, 3GPP.
(Continued)

*Primary Examiner* — Ayaz R Sheikh
*Assistant Examiner* — Debebe A Asefa
(74) *Attorney, Agent, or Firm* — Coats & Bennett, PLLC

(57) ABSTRACT

The present disclosure relates to methods for transmitting or receiving one on more signals in a system where multiple numerologies are used, and for adapting, selecting, or determining the ON/OFF mask for said signals depending on the numerology used for the respective signals, and based on the location of critical signals close to the transient periods. The disclosure also relates to corresponding devices and to a computer program for executing the proposed methods, and to a carrier containing said computer program. Further, embodiments relating to a host computer and activities therein, is also comprised in the current disclosure.

26 Claims, 14 Drawing Sheets

(56) References Cited

U.S. PATENT DOCUMENTS

| | | | |
|---|---|---|---|
| 2017/0111930 A1 | 4/2017 | Rajagopal et al. | |
| 2018/0091373 A1* | 3/2018 | Manolakos | H04L 1/0001 |
| 2018/0191462 A1* | 7/2018 | Kwon | H04L 27/2666 |
| 2018/0343673 A1* | 11/2018 | Chen | H04W 74/006 |

OTHER PUBLICATIONS

3rd Generation Partnership Project, "3rd Generation Partnership Project; Technical Specification Group Radio Access Network; Study on New Radio Access Technology Physical Layer Aspects (Release 14)", Technical Report, 3GPP TR 38.802 V14.0.0, Mar. 1, 2017, pp. 1-143, 3GPP.

3rd Generation Partnership Project, "3rd Generation Partnership Project; Technical Specification Group Radio Access Network; Evolved Universal Terrestrial Radio Access (E-UTRA); User Equipment (UE) radio transmission and reception (Release 14)", Technical Specification, 3GPP TS 36.101 V14.1.0, Sep. 1, 2016, pp. 1-1187, 3GPP.

Samsung, CCA slot and tx-rx/rx-tx switching time, 3GPP TSG RAN WG1 #86bis, Lisbon, Portugal, Oct. 10-14, 2016, R1-1608982.

Panasonic, Discussion on uplink contol channel structure in short-duration, 3GPP TSG RAN WG1 Meeting #88, Athens, Greece, Feb. 13-17, 2017, R1-1702299.

Ericsson, Further discussions on implication of ON/OFF mask on sTTI operations, 3GPP TSG-RAN WG4 Meeting #82, Athens, Greece, Feb. 13-17, 2017, R4-1701629.

Ericsson, UE transient period for NR, 3GPP TSG-RAN WG4 #82bis, Spokane, Washington, USA, Apr. 3-7, 2017, R4-1703850.

Intel Corporation, Tx requirements for above 6 GHz, 3GPP TSG-RAN4#82bis, Spokane, USA, Apr. 3-7, 2017, R4-1703137.

RAN4, Reply LS to RAN1 on implication of sTTI operation on UL ON/OFF time mask, 3GPP TSG-RAN WG1 #83, Hangzhou, China, May 15-19, 2017, R4-1704840.

\* cited by examiner

| Sub-carrier spacing | Length of cyclic prefix (µs) | Slot length (#symbols) | Slot length (ms) |
|---|---|---|---|
| 15 kHz | ≈4.69 | 14 (7) | 1.0 (0.5) |
| 30 kHz | ≈2.34 | 14 (7) | 0.5 (0.25) |
| 60 kHz | ≈1.17 | 14 (7) | 0.25 (0.125) |
| 120 kHz | ≈0.5 | 14 | 0.125 (0.625) |
| 240 kHz | ≈0.29 | 14 | 0.625 (0.3725) |

Figure 5a

| Subcarrier spacing | 15 kHz | 30 kHz (2x15 kHz) | 60 kHz (4x15 kHz) | 120 kHz (8x15 kHz) | 240 kHz (16x15 kHz) |
|---|---|---|---|---|---|
| Example slot duration | 500 µs | 250 µs | 125 µs | 77.5 µs | 38.75 µs |
| OFDM symbol, duration | 66.67 µs | 33.33 µs | 16.67 µs | 8.335 µs | 4.1675 µs |
| Cyclic prefix, duration | 4.76 µs | 2.38 µs | 1.19 µs | 0.595 µs | 0.2975 µs |
| OFDM symbol including cyclic prefix | 71.43 µs | 35.71 µs | 17.86 µs | 8.93 µs | 4.465 µs |

Figure 5b

- Option 1:

- Option 2:

- Option 3:

ADAPTATION OF ON/OFF MASK FOR NR WITH DIFFERENT NUMEROLOGIES

TECHNICAL FIELD

The present disclosure relates signal transmission in wireless communications. More specifically, the proposed technique relates to methods for transmitting or receiving one on more signals in a system where multiple numerologies are used, and for adapting, selecting, or determining the ON/OFF mask for said signals depending on the numerology used for the respective signals. The disclosure also relates to corresponding devices and to a computer program for executing the proposed methods, and to a carrier containing said computer program. Further, embodiments relating to a host computer and activities therein, is also comprised in the current disclosure.

BACKGROUND

The fifth generation of mobile telecommunications and wireless technology is not yet fully defined but in an advanced draft stage within 3GPP. 5G wireless access will be realized by the evolution of Long Term Evolution, LTE, for existing spectrum in combination with new radio access technologies that primarily target new spectrum. Due to the scarcity of available spectrum, spectrum located in very high frequency ranges (compared to the frequencies that have so far been used for wireless communication), such as 10 GHz and above, are planned to be utilized for future mobile communication systems. Thus, evolving to 5G includes work on a New Radio (NR) Access Technology (RAT), also known as 5G or next generation (NX). The NR air interface targets spectrum in the range from sub-1 GHz (below 1 GHz) up to 100 GHz with initial deployments expected in frequency bands not utilized by LTE. Some LTE terminology is used in this disclosure in a forward looking sense, to include equivalent 5G entities or functionalities although a different term may be specified in 5G. A general description of the agreements on 5G New Radio (NR) Access Technology so far is contained in 3GPP TR 38.802 V14.0.0 (2017-03). Final specifications may be published inter alia in the future 3GPP TS 38.2** series.

Physical resources for RATs used in wireless communication, such as LTE and NR, networks may be scheduled in time and frequency in what could be seen as a time and frequency grid. For example, the basic downlink physical resource of the RAT LTE can be seen as a time-frequency grid as illustrated in FIG. 1. LTE uses Orthogonal Frequency Division Multiplexing (OFDM) in the downlink (DL) and a pre-coded version of OFDM called Single Carrier Frequency Division Multiple Access (SC-FDMA) in the uplink (UL). LTE uses OFDM to transmit the data over many narrow band carriers, usually of 180 kHz each, instead of spreading one signal over the complete 5 MHz carrier bandwidth, in other words OFDM uses a large number of narrow sub-carriers for multi-carrier transmission to carry data. OFDM is thus a so called multi carrier system. Multi carrier systems are systems that uses multiple sinusoidal waves of predefined frequencies as multiple subcarriers. In multicarrier systems, data are divided on the different subcarriers of one transmitter. The difference between the frequencies of two adjacent subcarriers is called the frequency domain subcarrier spacing or subcarrier spacing for short. The OFDM symbols are grouped into so called physical resource blocks (PRB) or just resource blocks (RB). The basic unit of transmission in LTE is a RB, which in its most common configuration consists of 12 subcarriers and 7 OFDM symbols (one slot). In LTE the resource blocks have a total size of 180 kHz in the frequency domain and 0.5 ms (one slot) in the time domain. Each element in the time-frequency grid containing one symbol and one subcarrier is referred to as a resource element (RE). Each 1 ms Transmission Time interval (TTI consists of two slots (Tslot), usually represented by 14 OFDM symbols. LTE downlink transmissions are organized into radio frames of 10 ms, each radio frame consisting of ten equally-sized subframes of length Tsubframe=1 ms, as shown in FIG. 2. The resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth.

The new RAT NR will use a similar structure for the physical resources as LTE, using multiple carriers in frequency and symbols in the time domain, defining resource elements of physical resource blocks. The physical resource parameters may vary in NR. For example, the carriers may span a variable frequency range, the frequency spacing or density between the carriers may vary, as well as the cyclic prefix (CP) used. The frequency spacing between subcarriers can be seen as the frequency bandwidth between the center of a subcarrier and the adjacent subcarrier, or the bandwidth occupied by each subcarrier in the frequency band. A resource defined by one subcarrier and one symbol is called a resource element (RE).

It has been proposed that the duration of the subframes in NR should always have a duration of 1 ms, and that the transmission could be flexibly defined by using slots, the slots being proposed to contain 14 or 7 time symbols (symbols of a defined time duration), such as OFDM (DFTS-OFDM, Discrete Fourier Transform Spread OFDMA) or SC-TDMA. The use of so called "mini-slots" have also been proposed which could have a variable length (any duration of symbols) and start position, thus they could be located anywhere in the slots, and could be as short as one symbol long. NR defines different slot formats or slot configurations, a slot can be 7 or 14 symbols which is also referred to as a slot interval, a slot duration can be a pure UL slot or it can have a DL control region, a slot duration can accommodate differently long guard periods between duplex directions, multiple slots can be aggregated, numerologies with extended cyclic prefix result in fewer symbols per slot. A "slot" could also refer to the length in symbols of a transmission.

NR architecture is being discussed in 3GPP and the current concept is illustrated in FIG. 3, where eNB denotes LTE eNodeB, gNB denotes NR BS (one NR BS may correspond to one or more transmission/reception points), and the lines between the nodes illustrate the corresponding interfaces which are under discussion in 3GPP. Further, FIG. 4 illustrates deployment scenarios with NR BS which are discussed in 3GPP.

In Carrier Aggregation (CA), two or more Component Carriers (CCs) are aggregated in order to support wider transmission bandwidths. A UE may simultaneously receive or transmit on one or multiple CCs depending on its capabilities. CA is supported for both contiguous and non-contiguous CCs. CA is used in LIE-Advanced in order to increase the bandwidth, and thereby increase the bitrate. Since it is important to keep backward compatibility with R8 and R9 UEs the aggregation in LTE-A is based on R8/R9 carriers. Carrier aggregation can be used for both FDD (frequency division duplex) and TDD (time division duplex). Each aggregated carrier is referred to as a component carrier, CC. The CCs can have a bandwidth of e.g. 1.4, 3, 5, 10, 15 or 20 MHz. In FDD the number of aggregated carriers can be different in DL (downlink) and UL (uplink). However, the number of UL component carriers is always equal to or lower than the number of DL component carriers. The individual component carriers can also be of different bandwidths. For TDD the number of CCs as well as the bandwidths of each CC will normally be the same for DL and UL.

There are two categories of CCs:

Primary component carrier (PCC): This is the main carrier in any group. There will be a primary downlink carrier and an associated uplink primary component carrier.

Secondary component carrier (SCC): There may be one or more secondary component carriers.

There is no definition of which carrier should be used as a primary component carrier—different terminals may use different carriers. The configuration of the primary component carrier is terminal specific and will be determined according to the loading on the various carriers as well as other relevant parameters. In addition to this the association between the downlink primary carrier and the corresponding uplink primary component carrier is cell specific. Again, there are no definitions of how this must be organized. The information is signaled to the terminal of user equipment as part of the overall signaling between the terminal and the base station.

In LTE, carrier aggregation may be used for communication using also unlicensed spectrum. LAA (licensed assisted access) involves a licensed LTE band as the primary carrier and Carrier Aggregation (CA) used to add a carrier in unlicensed 5 GHz (Wi-Fi) spectrum. High-priority traffic can use the licensed band, while lower priority traffic can use the Wi-Fi channel. The decision on traffic allocation is made by the LAA-enabled base station/small cell, and there is no impact on the core network infrastructure. TDD and FDD modes are supported in the standard. Fair coexistence in the unlicensed channel is provided by a region-specific listen-before-talk (LBT) capability to ensure channels are clear before transmission. LBT is mandatory in the EU and Japan. LTE-U (LTE unlicensed) is a technology which is similar to LAA with Carrier Aggregation. There are no core network changes. Decisions on spectrum use are made by the base station/small cell—except that LTE-U uses Carrier-Sensing Adaptive Transmission (CSAT) rather than LBT to determine when the 5 GHz unlicensed Wi-Fi spectrum is in use to maintain fair coexistence. MulteFire is an approach using unlicensed spectrum for LTE, but with no aggregation with a licensed carrier.

It has beem agreed that NR will also make use of the unlicensed spectrum and a solution for NR-based access to unlicensed spectrum, to be compatible with the NR concepts is being discussed. The coexistence between NR-based operation in unlicensed and LTE-based Licensed Assisted Access have been discussed, as well as coexistence with Wi-Fi services and the use of unlicensed spectrum on a standalone basis—especially for 5G—which opens the door to new deployment scenarios, including "local area networks in dense deployments, so-called private IoT (Internet of Things) networks for enterprises or Industrial IoT, neighborhood networks, and neutral host deployments (where one deployment serves multiple operators). Examples where such private IoT networks can be deployed are anything from factories, ports, and mines to warehouses and smart buildings. The current studies will eventually result in expanded functionalities for 5G in future 3GPP releases that are part of a 5G NR Spectrum Sharing vision, or NR-SS. Under development is thus a non-standalone 5G NR variant which will use the LTE radio and core network as an anchor for a new 5G carrier, which will set the stage for early deployments. Further developments include 5G NR operating in unlicensed spectrum. The study item considers both stand-alone unlicensed deployment, as well as license-assisted access. In the scope is NR operating standalone in unlicensed spectrum without any necessity for a licensed anchor, called the MulteFire evolution path toward 5G.

A numerology defines basic physical layer parameters, such as subframe structure and may include transmission bandwidth, subframe duration, frame duration, slot duration, symbol duration, subcarrier spacing, sampling frequency, number of subcarrier, RB per subframe, symbols per subframe, CP length etc. In LTE the term numerology includes, e.g., the following elements: frame duration, subframe or TTI (time transmission interval) duration, slot duration, subcarrier spacing, cyclic prefix length, number of subcarriers per RB, number of RBs within the bandwidth (different numerologies may result in different numbers of RBs within the same bandwidth).

The exact values for the numerology elements in different RATs are typically driven by performance targets. For example, performance requirements impose constraints on usable subcarrier spacing sizes, e.g. the maximum acceptable phase noise sets the minimum subcarrier bandwidth while the slow decay of the spectrum (impacting filtering complexity and guard band sizes) favors smaller subcarrier bandwidth for a given carrier frequency, and the required cyclic prefix sets the maximum subcarrier bandwidth for a given carrier frequency to keep overhead low. However, the numerology used so far in the existing RATs is rather static and typically can be trivially derived by the user equipment (UE) or wireless device, e.g., by one-to-one mapping to RAT, frequency band, service type (e.g., Multimedia Broadcast Multicast Service (MBMS)), etc. In LTE downlink which is OFOM-based, the subcarrier spacing is 15 kHz for normal CP and 15 kHz and 7.5 kHz (i.e., the reduced carrier spacing) for extended CP, where the latter is allowed only for MBMS-dedicated carriers.

The support of multiple numerologies has been agreed for NR, which numerologies can be multiplexed in the frequency and/or time domain for the same or different UEs. Different numerologies may thus coexist on the same subcarrier. The term numerology may characterize any one or more of: frame duration, subframe or TTI duration, slot duration, min-slot duration, symbol durations subcarrier spacing, number of subcarriers per physical channel (e.g. RB), number of RBs within the bandwidth. A numerology in NR may be defined by subcarrier spacing and CP overhead. Multiple subcarrier spacings can be derived by scaling a basic subcarrier spacing by an integer N. A scaling approach (based on a scaling factor $2^N$, N=1, 2, . . . ) is considered for deriving subcarrier spacings for NR: 15 kHz, 30 kHz, 60 kHz, 120 kHz etc. The numerology-specific time resource durations (e.g. slot, subframe etc.) can then be determined in ms based on the subcarrier spacing: subcarrier spacing of $(2^N*15)$ kHz gives exactly $\frac{1}{2}^N$ ms. The numerology used can be selected independently of the frequency band although it is assumed not to use a very low subcarrier spacing at very high carrier frequencies. Flexible network and UE channel bandwidth is supported. Tables in FIGS. 5a and 5b with different numerologies proposed for NR is shown in FIGS.

5a and 5b, which illustrates examples of numerology for NR in terms of carrier spacings, slot duration, symbol duration, CP length etc.

In NR which is to be based on OFOM, the multiple numerologies will be supported for general operation, e.g. transmission and/or reception of signals. As mentioned above, a scaling approach (based on a scaling factor $2^n$, n∈N_0) is considered for deriving subcarrier spacing candidates for NR. Values for subcarrier bandwidths currently discussed include among others 3.75 kHz, 15 kHz, 30 kHz, 60 kHz, 120 kHz. The numerology-specific slot durations can then be determined in ms based on the subcarrier spacing: subcarrier spacing of $(2^m*15)$ kHz, m being an integer, gives exactly ½m 0.5 ms for a slot that is 0.5 ms in the 15 kHz numerology. Thus, each numerology is related to an n value, and where n is a non-negative integer, the subcarrier spacing is defined as $15 kHz*2^n$ for a numerology n. Each symbol length (including CP) of 15 kHz subcarrier spacing equals the sum of the corresponding $2n$ symbols of the scaled subcarrier spacing.

Subcarrier spacings of at least up to 480 kHz are currently being discussed for NR (the highest discussed values correspond to millimeter-wave based technologies). It has also been agreed that multiplexing different numerologies within a same NR carrier bandwidth is supported, and FDM and/or TDM multiplexing can be considered. It has further been agreed that multiple frequency/time portions using different numerologies share a synchronization signal, where the synchronization signal refers to the signal itself and the time-frequency resource used to transmit the synchronization signal. Yet another agreement is that the numerology used can be selected independently of the frequency band although it is assumed that a very low subcarrier spacing will not be used at very high carrier frequencies. In NR the transmission bandwidth of a single carrier transmitted by a network node (also known as gNB) may be larger than the UE bandwidth capability, or the configured receiver bandwidth of a connected device (such as UE). Each gNB may also transmit using different numerologies which are time division multiplexed (TDM) or frequency division multiplexed (FDM).

Time division duplex (TDD)-based communications systems divide the time domain into transmission and reception periods. Transition between both has to be very fast in order to efficiently use the resources in the time domain. Verifying these ON and OFF power levels of a base transceiver station during design demands measurement instruments with high dynamic ranges. TDD-LTE base stations need to pass two transmit ON/OFF power tests defined in chapter 6.4 of the 3GPP TS 36.141 technical specification:

Transmitter OFF Power

The purpose of the transmitter OFF power test in chapter 6.4.1 is to verify that the output power of the base station does not exceed the specified limit during the OFF period of the signal.

Transmitter Transient Period

The purpose of the transmitter transient period test in chapter 6.4.2 is to verify that the time period during which the transmitter is changing from ON to OFF, or vice versa, is short enough to prevent interference with adjacent timeslots.

ON/OFF Time Mask

The time mask for transmit ON/OFF defines the ramping time allowed for the UE between the "transmit OFF power" and "transmit ON power." Transmission of the wrong power increases interference to other channels, or increases transmission errors in the uplink channel. General on/off time mask shall be tested for all E-UTRA UEs from 3GPP Rel-8 and forward. General on/off time mask testing is performed to verify the performance of the UE's output power before and after transitions between transmit off power and transmit on power. No downlink reference measurement channel is used. The UE transmits only during subframe 2 of every frame. The UE's transmit off power is measured twice (in the subframes directly before and after subframe 2) and the UE's transmit on power is measured during subframe 2. The UE's output power is measured over one subframe (1 ms) excluding a 20 μs transient period at the beginning of the subframe. A UE that cannot meet the requirements has an increased probability of uplink transmission errors and causes interference on other channels.

In the 3GPP telecommunication standard (TS 36.101, v14.1.0, Section 6.3.4) it is stated that "The General ON/OFF time mask defines the observation period between Transmit OFF and ON power and between Transmit ON and OFF power. ON/OFF scenarios include; the beginning or end of DTX, measurement gap, contiguous, and non contiguous transmission. The OFF power measurement period is defined in a duration of at least one sub-frame excluding any transient periods. The ON power is defined as the mean power over one sub-frame excluding any transient period. There are no additional requirements on UE transmit power beyond that which is required in subclause 6.2.2 and subclause 6.6.2.3." An illustration of the General ON/OFF time mask can be seen in FIG. 6 (Source: TS 36.101, v14.1.0, FIG. 6.3.4.1-1). As seen in FIG. 6 the ON/OFF time mask is designed for 1 ms TTI in Rel-8 legacy LTE systems.

The currently used ON/OFF time mask is designed for systems where only one numerology is used. Since NR is agreed to have multiple numerologies, there is a need for a new design which is compatible with the use of multiple numerologies.

SUMMARY

An object of the present disclosure is to provide methods and devices which seek to mitigate, alleviate, or eliminate the above-identified deficiencies in the art and disadvantages singly or in any combination. This object is obtained by a method for use in a wireless device in a wireless communication system, for transmitting a first and a second signal, S1 and S2, using a first and a second numerology, N1 and N2, the method comprising: determining a first and a second ON/OFF mask, M1 and M2, for transmission of the signals S1 and S2 based at least on the numerologies N1 and N2, and transmitting the signals S1 and S2 based on the determined ON/OFF masks M1 and M2.

In a further aspect, the ON/OFF masks M1 and M2 are determined based on the types of signals comprised in S1 and/or S2, wherein the determination may be based on the presence of critical signals in S1 and/or S2.

According to some aspects, the method further comprises obtaining information indicating a first signal S1, to be transmitted using a first numerology N1 on a first time resource T1, and a second signal S2 to be transmitted using a second numerology N2 on a second time resource T2.

According to some aspects, the disclosure proposes a method for use in a network node in a wireless communication system for receiving a first and a second signal, S1 and S2, transmitted using a first and a second numerology, N1 and N2, during a first and second time resource, T1 and T2, the method comprising: determining the ON/OFF masks, M1 and M2, used by the UE for transmission of signals S1 and S2 based on at least the numerologies N1 and N2, and receiving, from the wireless device, a first and a second signal, S1 and S2, based on the determined ON/OFF masks, M1 and M2, used by the wireless device for transmission of S1 and S2 during T1 and T2 respectively.

According to some aspects, the method further comprises configuring a wireless device with a first signal S1 to be transmitted at time T1 with numerology N1 and a second signal S2 to be transmitted in time T2 with numerology N2.

According to some aspects, the disclosure proposes a wireless device, configured to operate in a wireless communication system, configured for transmitting for transmitting a first and a second signal, S1 and S2, using a first and a second numerology, N1 and N2, to a network node, the wireless device comprising a communication interface and processing circuitry configured to cause the wireless device to determine a first and a second ON/OFF mask, M1 and M2, for transmission of the signals S1 and S2 based on the numerologies N1 and N2, and to transmit the signals S1 and S2 based on the determined ON/OFF masks M1 and M2.

In one aspect, the processing circuitry is further configured to obtain information indicating a first signal S1, to be transmitted using a first numerology N1 on a first time resource T1, and a second signal S2 to be transmitted using a second numerology N2 on a second time resource T2.

According to some aspects, the disclosure proposes a network node, configured to operate in a wireless communication system, configured for receiving a first and a second signal, S1 and S2, transmitted using a first and a second numerology, N1 and N2, during a first and second time resource, T1 and T2, the network node comprising a communication interface, and processing circuitry configured to cause the network node to determine on ON/OFF masks, M1 and M2, used by the UE for transmission of signals S1 and S2 based on the numerologies N1 and N2; and to receive from the wireless device, a first and a second signal, S1 and S2, based on the determined ON/OFF masks, M1 and M2, used by the wireless device for transmission of S1 and S2 during T1 and T2 respectively.

In one aspect, the processing circuitry is further configured to configure a wireless device with a first signal S1 to be transmitted at time T1 with numerology N1 and a second signal S2 to be transmitted in time T2 with numerology N2.

According to some aspects, the disclosure proposes a computer program comprising computer program code which, when executed in a wireless device, causes the wireless device to execute the methods described below and above.

According to some aspects, the disclosure proposes a computer program comprising computer program code which, when executed in a network node, causes the network node to execute the methods described below and above.

According to some aspects, the disclosure proposes a carrier containing the computer program, wherein the carrier is one of an electronic signal, optical signal, radio signal, or computer readable storage medium.

BRIEF DESCRIPTION OF THE DRAWINGS

FIGS. 5a and 5b are tables showing different numerologies proposed for NR, including example subcarrier spacing candidate configurations for NR.

DETAILED DESCRIPTION

Figure 1:
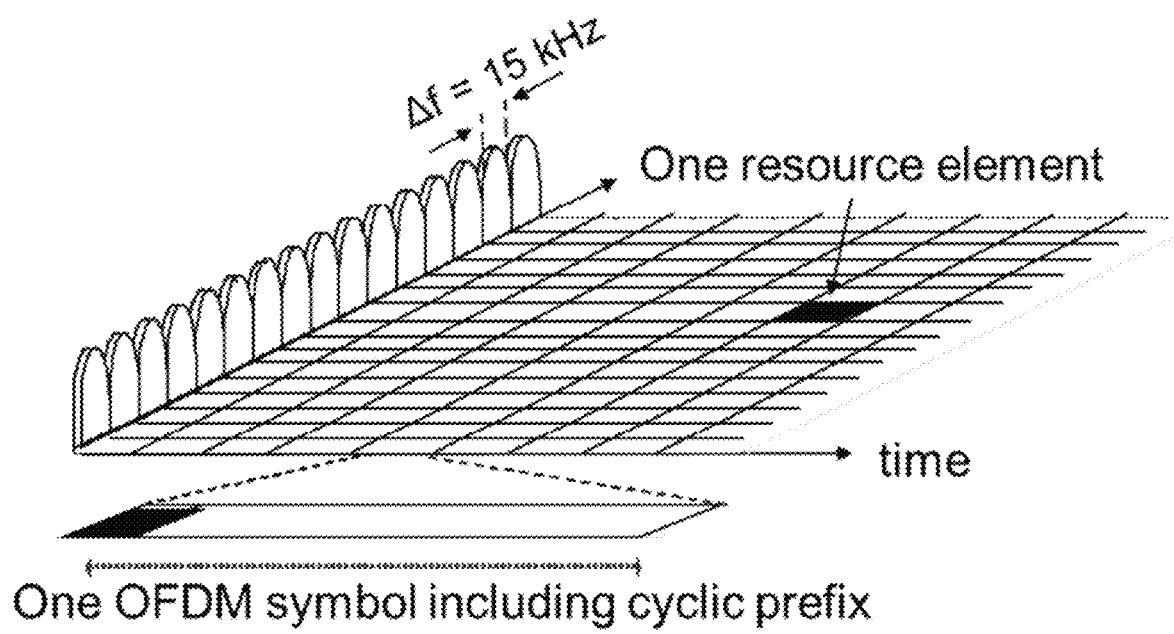
FIG. 1 illustrates the LTE downlink physical resource seen as a time/frequency grid.
Figure 2:
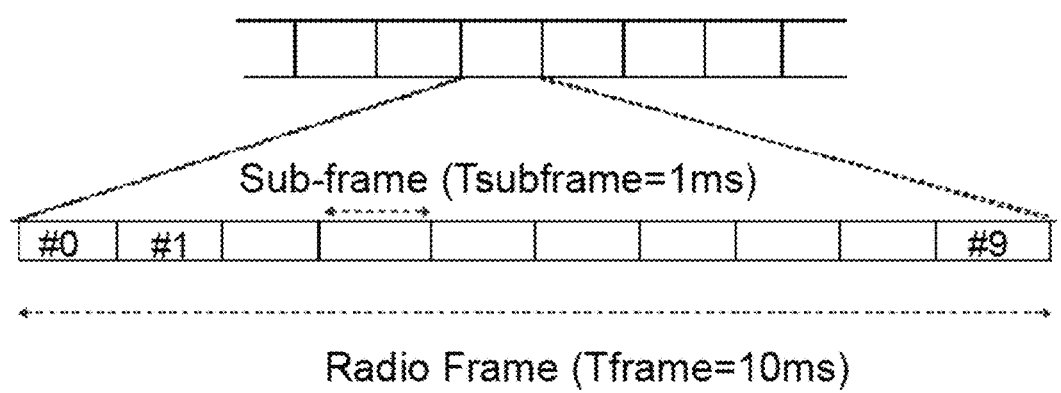
FIG. 2 is an illustration of the LTE time-domain structure.
Figure 3:
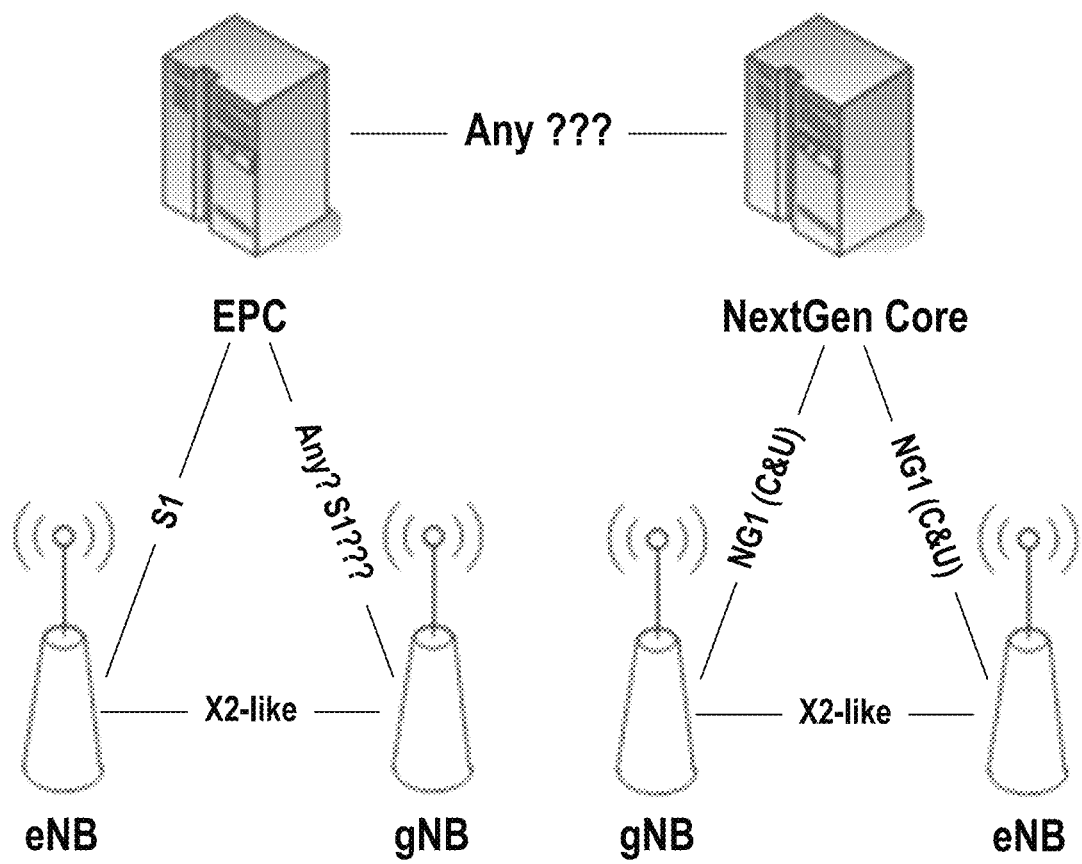
FIG. 3 is an illustration of the current concept for NR architecture.
Figure 4:
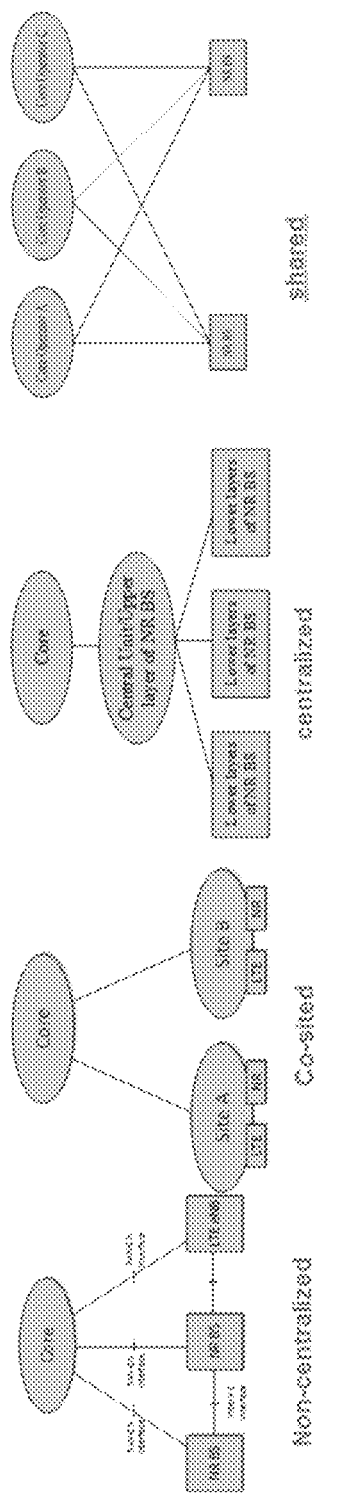
FIG. 4 is an illustration of possible NR deployment scenarios.
Figure 6:
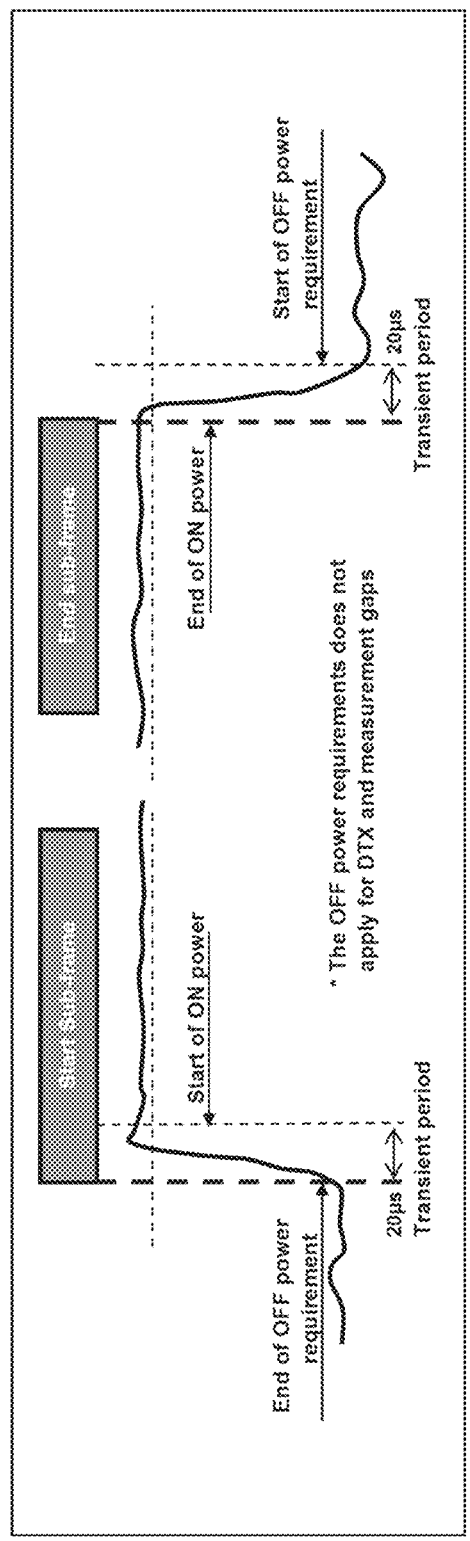
FIG. 6 is an illustration of a general ON/OFF time mask.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPad, Tablet, mobile terminals, smart phone, laptop embedded equipped (LEE), laptop mounted equipment (LME), USB dongles, Customer Premises Equipment (CPE) etc.

Also in some embodiments generic terminology "network node", is used. It can be any kind of network node which may comprise of a radio network node such as base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), TP (transmission point), TRP (transmission reception point), a core network node (e.g., MME, SON node, a coordinating node, positioning node, MDT node, etc.), or even an external node (e.g., 3rd party node, a node external to the current network), etc. The network node may also comprise a test equipment.

The term "symbol" or "time symbol" defines a duration in the time domain. A symbol or time symbol may be a OFDM, RETS-OFDM or SC-TDMA symbol.

Figure 7:
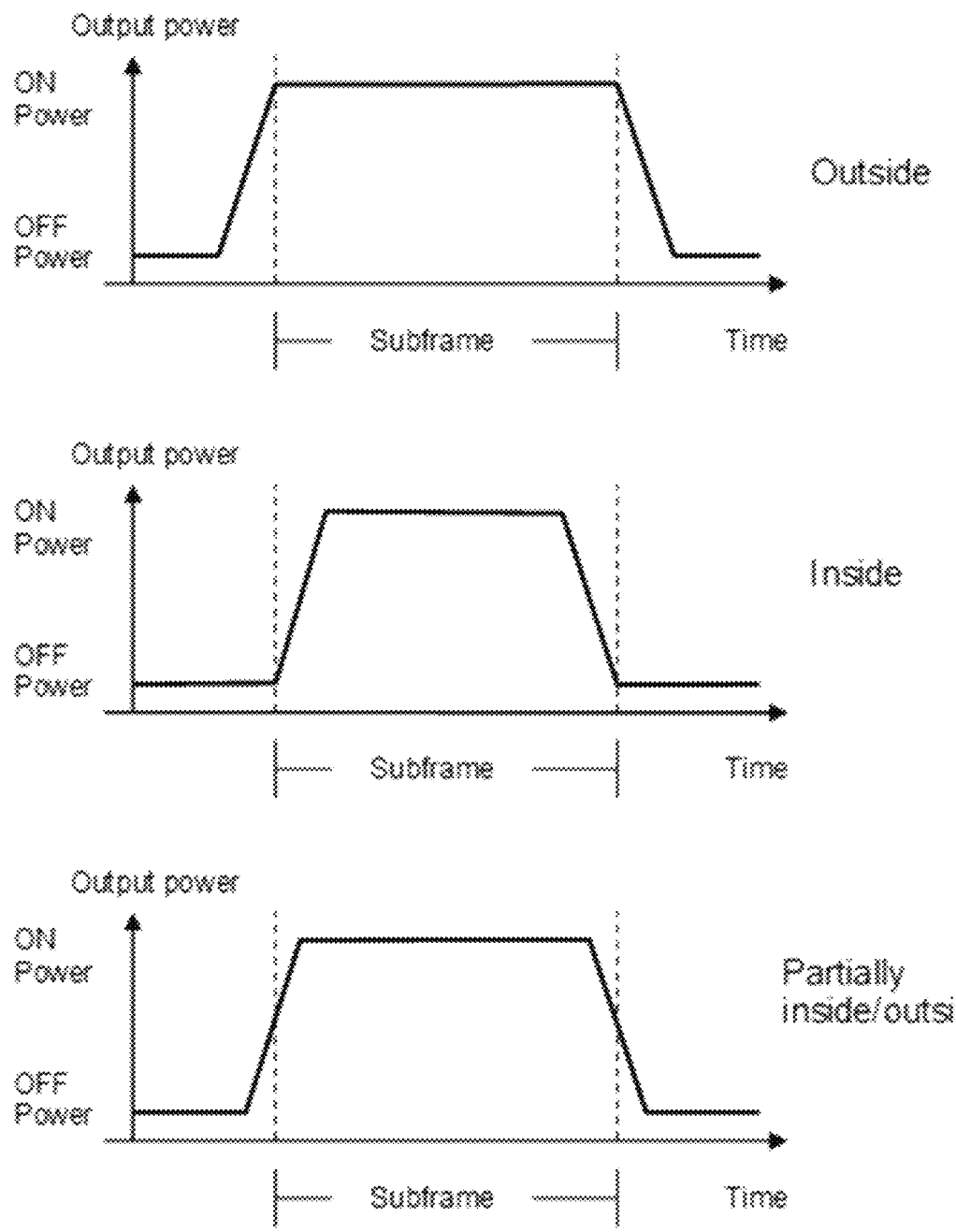
FIG. 7 is an illustration of ramping up and down of power in different possible locations in time in the mask.

The time mask for transmit ON/OFF defines the ramping time allowed for the UE between the "transmit OFF power" and "transmit ON power", as mentioned above. The duration of ramping of power (UP or DOWN) in the mask is shorter compared to the length of sub-frame or slot, but its position, also known as transient position or transient location, has an influence on system performance. The ramping UP or ramping DOWN duration is also called transient time parameter. More specifically the transient time parameter defines at least a time period between any two points in time over which the UE changes its transmit power, and the duration might be referred to as a transient period or transient time period. For example, as shown in FIG. 7, during a transient time the UE changes its transmit power from OFF power level to ON power level, or from ON power level to OFF power level. The transient periods due to power steps, OFF/ON and ON/OFF transitions could occur at slot or symbol boundary with transients, on one or both sides of the boundary. One could thus see the transient time parameter as the value of the transient time. The transient position has a special location while the transient time (parameter) is a duration in time. The mask includes ramp up time, then ON power duration and ramp down time. The ramp up and ramp down times correspond to transient time.

In terms of ramping or transient position there few non-limiting possibilities:

Ramping outside timeslot/sub-frame
Ramping inside timeslot/sub-frame
Ramping partly inside and outside timeslot/sub-frame The different possibilities for location of the power ramps are illustrated in FIG. 7.

The current ON/OFF masks defined in the LTE specifications cover the case when only a single numerology is used on any carrier. Similar assumption is currently used for ON/OFF mask i.e. single numerology is used on an NR carrier. In case of multiple numerologies, the placement of ramp up and/or ramp down (transient position) within or outside the transmission duration will have different impact based on different numerologies. Different numerologies will have different symbol durations due to different sub-carrier spacings, hence the room within a symbol for the transient period may vary. This will also affect the transmitted signals, and it is important that the location of the transient period does not interfere with critical signaling. Thus, it is proposed that the placement of the transient period should be made in view of the signals to be transmitted and the subcarrier spacing (SCS) used.

The current disclosure provides solutions to the above-mentioned problems and drawbacks by adapting the ON/OFF masks (the length (duration) and location of the transient period) to take the type of signaling and numerology (sub carrier spacing of the numerology) into account. The current disclosure comprises methods and apparatuses for transmitting and receiving one or more signals, such as a first and a second signal, S1 and S2, transmitted using a first and a second numerology, N1 and N2, during a first and second time resource, T1 and T2, by adapting the used ON/OFF mask based on the numerologies N1 and N2.

Some of the advantages of the embodiments of this disclosure is that it defines ON/OFF masks based on numerologies used between success signals for enabling optimum uplink transmissions, that the transmission of critical signals/critical signaling, such as uplink reference signals e.g. sounding reference signal, SRS, or demodulation reference signal, (DMRS) or physical uplink control channel (PUCCH) signaling etc., are not degraded when different numerologies are used for transmission of signals by the UE in successive time resources, and that reception quality of uplink signals at the base station is enhanced when multiple numerologies are used for transmission of signals in successive time resources. Hence, adapting the location and length of the transient period based on type of signaling and the sub carrier spacing used for transmission would address the above-mentioned problems arising by using the legacy ON/OFF mask used for LTE also for NR.

This disclosure consists of several embodiments related to methods in a UE and BS as described below. According to one aspect of the embodiments the UE adapts the location of the transients in time (transient position) caused due to transmission of signals (S1 and S2) in successive time resources (T1 and T2) based on the comparison of a first numerology (N1) and a second numerology (N2); where N1 and N2 are used by the UE for transmission of S1 and S2 respectively. When transmitting a signal a transient may be caused (a transition in transmit power needed to be performed) for that transmission. The transient time defines at least a time period over which the UE changes its transmit power from an OFF power limit to ON power limit, or time period over which the UE changes its transmit power change. The numerologies N1 and N2 may be represented by their subcarrier spacings, i.e. the subcarrier spacing used for said numerologies. Examples of N1 and N2 are subcarrier spacing1 (SCS1) and subcarrier spacing2 (SCS2). The subcarrier spacing will affect the duration of the time symbols, and the greater the sub carrier spacing, the shorter the duration length of the symbol and thus the time resource T. Thus, if SCS1<SCS2, then T1>T2, hence there will be more room in T2 to place the transient period. Thus, if only regarding the numerology or sub carrier spacing of the numerology, the UE may adapt the location of the transient period based on the relative sizes of T. For example, the adaptation of transient location (transient position) in time is performed by the UE according to the following rules:

when SCS1<SCS2, then the UE place all transients caused by transmission of S1 in end of T1 and by transmission of S2 at start of T2, inside T1;

when SCS1>SCS2, then the UE place all transients caused by transmission of S1 in end of T1 and by transmission of S2 at start of T2, inside T2; and when SCS1=SCS2, then the UE place all transients caused by transmission of S1 in end of T1 and by transmission of S2 at start of T2, inside T2 or inside T1, or partly inside T1 and partly inside T2.

If any of the transmitted signals S1 or S2 contain critical signals, such as SRS, DMRS or PUCCH, this must also be considered when adapting the transient location to protect the signals and avoid transients in the symbols transmitting the critical signals.

In one embodiment, a method of adapting ON/OFF mask in a UE operating in carrier aggregation mode comprises the steps of:

Step-1: Obtaining or determining a signal S1 with numerology N1, wherein the numerology may for example define a first subcarrier spacing SCS1, and transmitting S1 over a first time resource (T1); and similarly, obtaining or determining a signal S2 with numerology N2, wherein the numerology may for example define a second subcarrier spacing SCS2, and transmitting S2 over a second time resource (T2);

T1 and T2 can be any of: TTI, slot, symbol, mini-slot, short TTI etc., e.g. T1=TTI1 of TTI duration and T2=TTI2 of TTI duration.

Step-2: Determine ON/OFF masks (denoted as M1 and M2 for signals S1 and S2 respectively) for transmission of signals S1 and S2, based on the numerology N1 and N2 and (optionally) the presence of any critical signals;

Step-3: Transmitting signals (S1 and S2), based on one of the determined ON/OFF masks (M1 and M2), as described in step 2.

In one embodiment, a method in a network node comprises the steps of:

Step-1: Configuring a UE with a first signal S1 to be transmitted in time resource T1 with numerology N1 and a second signal S2 to be transmitted in time resource T2 with numerology N2.

Step-2: Determine ON/OFF masks (denoted as M1 and M2 respectively) for transmission of signals S1 and S2, based on the numerology N1 and N2 and (optionally) the presence of any critical signals;

Step-3: Receiving signals S1 and S2 based on the determined ON/OFF masks (M1 and M2), In the present disclosure, a first node and a second node is used as two nodes which are either transmitting or receiving in unlicensed spectrum (or a shared spectrum where more than one system operates based on some kind of sharing regulations).

An example of a first node could be a network node, which could be a more general term and can correspond to any type of radio network node or any network node, which communicates with a UE and/or with another network node. Examples of network nodes are NodeB, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, cloud node etc. In some embodiments generic terminology, "radio network node" or simply "network node (NW node)", is used. It can be any kind of network node which may comprise of base station, radio base station, base transceiver station, base station controller, network controller, gNode B (gNB), evolved Node B (eNB), Node B, relay node, access point, radio access point, Remote Radio Unit (RRU) Remote Radio Head (RRH) etc.

Another example of a node could be user equipment, this is a non-limiting term user equipment (UE) and it refers to any type of wireless device communicating with a network node and/or with another UE in a cellular or mobile communication system. The UE itself may also be a device wired to another device which in turn communicates wirelessly with other nodes. Examples of UE are target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles etc.

In the current disclosure, any of the above-mentioned nodes could become "the first node" and/or "the second node".

A "component carrier" (CC) also interchangeably called carrier, PCC or SCC is configured at the UE by the network node using higher layer signaling e.g. by sending RRC configuration message to the UE. The configured CC is used by the network node for serving the UE on the serving cell (e.g. on PCell (primary cell), PSCell (primary serving cell), SCell (secondary serving cell) etc.) of the configured CC. The configured CC is also used by the UE for performing one or more radio measurements (e.g. Reference Signal Received Power, RSRP, Reference Signal Received Quality, RSRQ etc.) on the cells operating on the CC e.g. PCell, SCell or PSCell and neighboring cells.

The term "fallback mode" refers herein to a CA configuration which contains fewer CCs than the maximum number of CCs in a CA combination supported by the UE. For example a UE supporting a CA combination with a maximum CA configuration of 4 DL CCs and 1 UL CC may support the following 3 fallback modes: 3 DL CCs and 1 UL CC, 2 DL CCs and 1 UL CC and 1 DL CC and 1 UL CC (i.e. single carrier operation). The term fallback mode is also interchangeably called as lower order CA combination, lower order CA configuration, fallback CA mode, fallback CA configuration mode, fallback CA combination etc.

The above definitions also include dual connectivity (DC) operation, which is actually performed based on corresponding CA configurations. In this disclosure, all methods that are described for CA operation are equally applicable to DC operation, unless stated otherwise.

In one embodiment of the current disclosure is defined a first signal S1, transmitted using a first numerology (N1) and over a first time resource (T1). T1 can be any of: TTI, slot, symbol, mini-slot, short TTI etc., e.g. T1=TTI1 of TTI duration. Also a second signal S2 is defined, transmitted with a second numerology (N2) and transmitted over a second time resource (T2). T2 can be any of: TTI, slot, symbol, mini-slot, short TTI etc., e.g. T2=TTI2 of TTI duration. T2 occurs immediately after T1 in time.

Numerologies N1 and N2 are defined by at least the sub-carrier spacing (SCS) used in the system, e.g. a first subcarrier spacing, SCS1, and a second subcarrier spacing, SCS2, which may be any of 15 KHz, 30 KHz, 60 KHz, 120 kHz, and 240 kHz or any other values which may be multiple of 15 KHz. In general, ramp up is within the time resource (e.g. within TTI) and ramp down is outside the time resource (e.g. outside of TTI).

In one embodiment a method in a UE or wireless device of adapting ON/OFF mask is comprised. The method may comprise the following steps:

Step-1: In this step, the UE obtains or determines a signal S1 with numerology N1 and transmits S1 over a first time resource (T1); and similarly, obtains or determines a signal S2 with numerology N2 and transmits S2 over a second time resource (T2).

The UE can determine that it has to transmit S1 and S2 based on any one or combinations of the following mechanisms:

Pre-defined information e.g. S1 is transmitted in a particular time resource such as RACK in certain default time resources.

Pre-configured information based on information received from network node, such as location of critical signals. For example the UE is configured to transmit S1=SRS and S2=PUCCH in specific symbols in a subframe.

Scheduling or resource allocation information received from the network node. For example the UE can be scheduled to transmit PUSCH on certain symbols.

As an example embodiment, the subcarrier spacing related to numerology N1 can be either smaller or larger than the subcarrier spacing related to numerology N2.

Step-2: In this step, the UE determines ON/OFF masks (denoted as M1 and M2 respectively) for transmission of signals S1 and S2, based on the numerology N1 and N2 and optionally also information about location of critical signals etc. as mentioned above. As example embodiments, there is a number of UE transmission ON/OFF mask options for cases related to the comparison between N1 and N2 (e.g. N1<N2, N1>N2 and N1=N2), which are described below:

Case-1:1: When N1<N2 (e.g. N1=SCS1; N2=SCS2), No Critical Signals, FIG. 8

Figure 8:
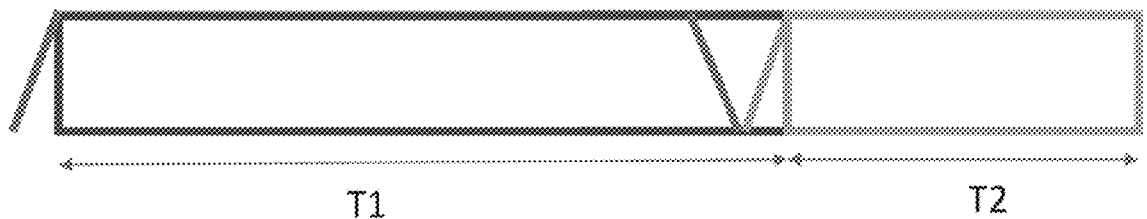
FIG. 8 shows an illustration of power ramping in T2 when SCS1<SCS2.

Since SCS1 is smaller than SCS2, then T1>T2. As an example, SCS1 of S1=15 kHz while SCS2 of S2=30 KHz. In this case, according to the first aspect of this embodiment, the ramp down of the UE transmit power from S1 is inside T1 and ramp up of the UE transmit power for S2 is outside T2 (i.e. inside T1). This is realized by the UE by adapting its transmission based on comparison of S1 and S2. This is illustrated in FIG. 8, power ramping in T2 when SCS1<SCS2. This example shows a case, when SCS2=2*SCS1, thus T1=2*T2. In this case, the ramp down from S1 will be within T1 and ramp up of S2 will be outside T2, which is within T1. The ramp up of S1 in T1 can be either outside the T1 or within T1. In FIG. 8, the ramp up of S1 shown as outside S1.

Figure 9:
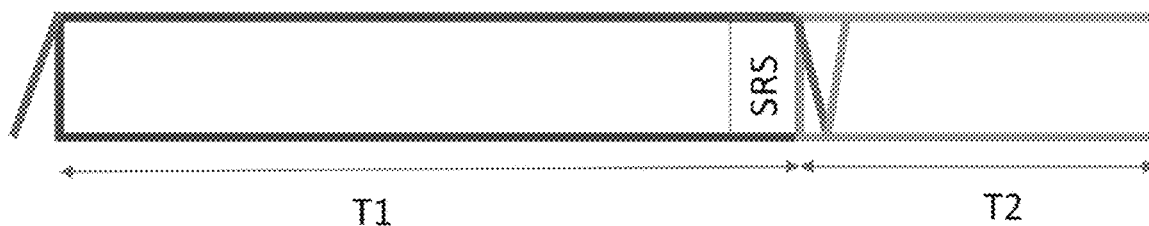
FIG. 9 shows an illustration of power ramping in T2 when SCS1<SCS2, and S1 contains critical signals (e.g. SRS).

Case 1:2, When N1<N2 and S1 Contains a Critical Signal, FIG. 9

As a specific embodiment, When the first symbol(s) in S2 signal is either DMRS or PUCCH, and N1<N2, i.e. T1>T2, then all transients are within T1, such that the UL symbols in the beginning of S2 are protected i.e. UL symbols at the start of T2 are not degraded or destroyed due to any ramp up of S2 or ramp down of S1. As another specific embodiment, when the last symbol(s) in S1 signal is critical signal and N1<N2, i.e. T1>T2, then any of the following procedure is applied by the UE based on location of the critical signal(s) in T1. The critical signals are used by the UE and/or the network node for vital operations such as channel estimation, signal quality estimation, time and/or frequency tracking or synchronization, transmission of control information etc. Examples of critical signals are DMRS (demodulation reference signals) or PUCCH (physical uplink control channel) or SRS (sounding reference signals).

The network node can ensure that, the first symbol(s) in S2 are not any of the critical signal (e.g. neither DMRS nor PUCCH nor SRS), such that, if the transients are placed in T2, the critical signals (e.g. SRS or PUCCH or DMRS) at the end of S1 will be protected i.e. critical signals will not be degraded due to signal transients (ramp down and/or ramp up). This is shown in FIG. 9, power ramping in T2 when SCS1<SCS2, and S1 contains critical signals (e.g. SRS).

FIG. 9 only shows SRS at the end of the S1 signal. However, the same can be valid for PUCCH or DMRS at the end of S1 signal.

Figure 10:
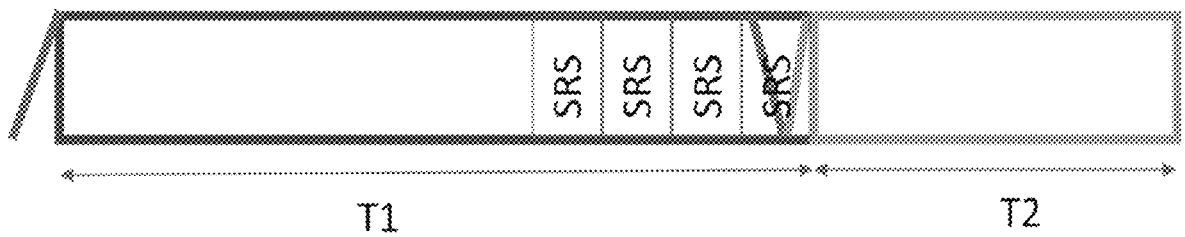
FIG. 10 shows an illustration of power ramping in T1 when SCS1<SCS2, and S1 contains multiple critical signals (e.g. SRS).

Case 1:3, When N1<N2 and S1 Contains Multiple Critical Signals, FIG. 10

If a number of adjacent uplink symbols larger than or equal to a threshold (Hs) is configured by the network node at the UE for transmission of critical signals (e.g. for SRS transmission) then the transient (ramp down of S1 and/or ramp up of S2) can be within the T1. Examples of Hs are 4 and 8 symbols. This is shown in FIG. 10, power ramping in T1 when SCS1<SCS2, and S1 contains multiple critical signals (e.g. SRS). In this case, the last SRS symbol will be affected due to transient time. But if the number of the adjacent uplink symbols containing critical signals in S1 is less than Hs then the transient due to S1 and S2 can be placed by the UE in T2. In this way all critical signals in S1 are protected.

Case-2:1: When N1>N2, No Critical Signals, FIG. 11

Figure 11:
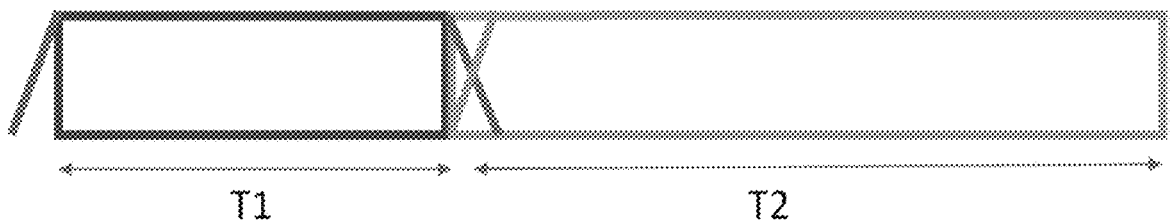
FIG. 11 shows an illustration of power ramping in T2 when SCS1>SCS2.

In case when SCS1>SCS2, thus T1<T2, according to the embodiment the UE adapts its transmission of signals such that all transients due to S1 and due to S2 occur within the start of T2. That means, the ramp down from S1 occurs outside T1 (i.e. inside T2) and ramp up of S2 occurs inside T2. The aim of this procedure in the UE is to protect the transmissions of signals in S1. Since T1 is smaller than T2 so any transient in T1 will significantly degrade the performance of S1. This is shown in FIG. 11, power ramping in T2 when SCS1>SCS2. In the example in FIG. 11, in general, signals in shorter TTI duration is protected with respect to signals in larger TTI duration.

Case-2:2: When N1>N2 and S1 Contains a Critical Signal, FIG. 12

As a specific embodiment: When S1 signal is critical signal (e.g. RS (reference signals), SRS etc.) in the last symbol of T1 and N1>N2, i.e. T1<T2, then the UE adapts its transmission such that all transients occur inside the T2 completely. This is shown in FIG. 12, power ramping in T1 when SCS1>SCS2 and S1 contains critical signals (e.g. SRS).

Case-2:3: When N1>N2 and S1 Contains Multiple Critical Signals, FIG. 13

Figure 12:
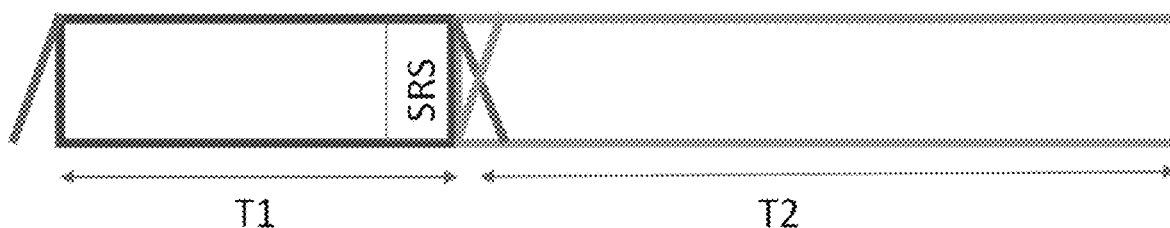
FIG. 12 shows an illustration of power ramping in T1 when SCS1>SCS2 and S1 contains critical signals (e.g. SRS).
Figure 13:
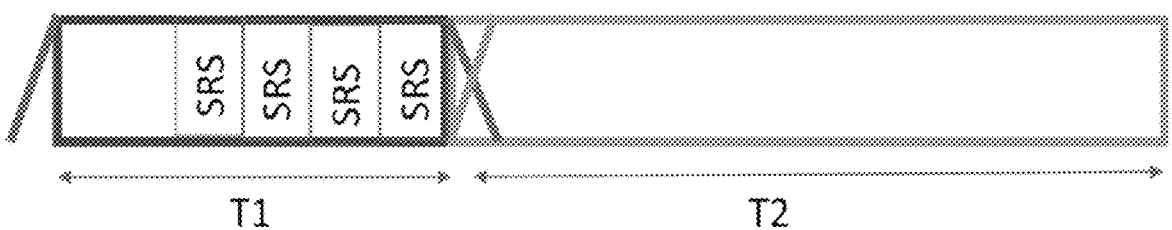
FIG. 13 shows an illustration of power ramping in T2 when SCS1>SCS2 and S1 contains multiple critical signals (e.g. SRS).

In another example embodiment, if a number of SRS symbols equal to or larger than Hs is used for transmission of consecutive critical signals (e.g. SRS pattern with number of SRS≥Hs), such as shown in FIG. 13 (power ramping in T2 when SCS1>SCS2 and S1 contains multiple critical signals (e.g. SRS)) then the same solution as in FIG. 12 for transient time placement in T2 can be used here. This means all transients (ramp down of S1 and/or ramp up of S2) can be placed by the UE within T2.

Case-2:4: When N1>N2 and S1 and S2 both contain at least one critical signal, FIG. 14

Figure 14:
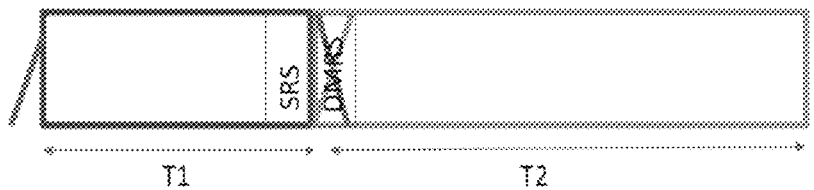
FIG. 14 shows an illustration of power ramping in T1, T2 or in partly T1 and partly T2, when SCS1>SCS2 and both S1 and S2 contains at least one critical signal (e.g. SRS, DMRS etc.).
Figure 14:
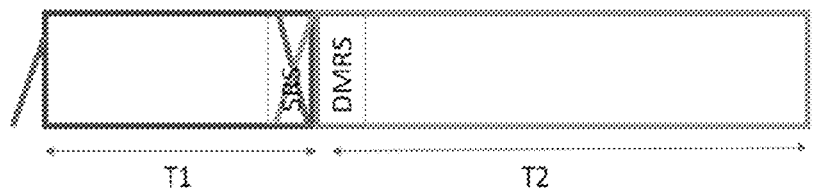
Figure 14:
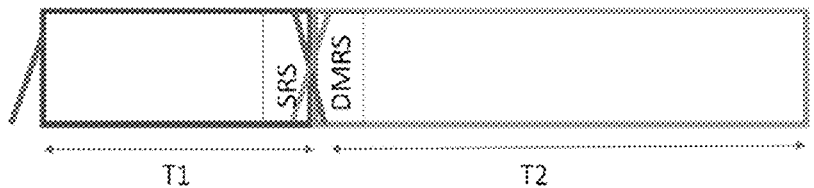

According to another example at least the symbol at the beginning of S2 (i.e. start of T2) has critical signals (e.g. control signals, such DMRS) and at least the symbol at the end of S1 (i.e. end of T1) also contains one or more critical signals as shown in FIG. 14, power ramping in T1, T2 or in partly T1 and partly T2, when SCS1>SCS2 and both S1 and S2 contains at least one critical signal (e.g. SRS, DMRS etc.). In this example according to a rule the UE can place all transients in any one of: start of T2 (option 1, FIG. 14), end of T1 (option 2, FIG. 14) and partly in end of T1 and start of T2 (option 3, FIG. 14). The selection of one of the options is based on priority or significance of signals among the critical signals transmitted in T1 and T2. For example if the critical signal (e.g. SIRS) in T1 is considered to be more important than the critical signal (e.g. DMRS) in T2 the UE selects option 1 for transmitted S1 and S2, otherwise the UE selects option 2 for transmitting S1 and S2. But if both critical signals in T1 and T2 are of equal importance then the UE selects option 3 for transmitting S1 and S2. This priority between critical signals in T1 and T2 can be defined by the UE autonomously, or priority information can be also signaled by the network node or can be done based on pre-defined priority list or pre-defined information.

Figure 15:
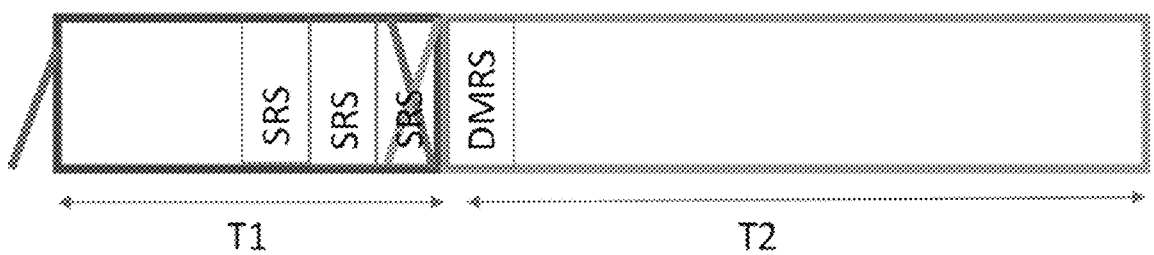
FIG. 15 shows an illustration of power ramping in T1, when SCS1>SCS2, S1 contains multiple critical signals (e.g. SRS) and S2 contains at least one critical signal (e.g. DMRS).

Case-2:5: When N1>N2 and S1 contains multiple critical signals and S2 at least one, FIG. 15 In another example embodiment, if more than one critical signals (e.g. SRS symbols) are used at the end of T1 containing S1 while the start of T2 also contains critical signal (e.g. DMRS), then the transient can be placed by the UE within T1, as shown in FIG. 15, power ramping in T1, when SCS1>SCS2, S1 contains multiple critical signals (e.g. SRS) and S2 contains at least one critical signal (e.g. DMRS).

Case-3: When N1=N2, FIG. 16

Figure 16:
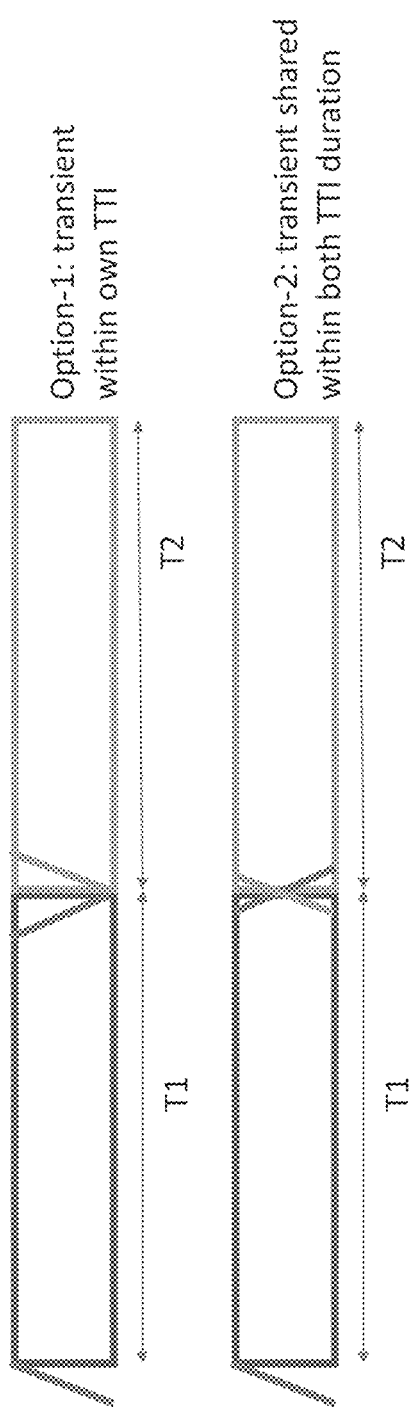
FIG. 16 shows an illustration of power ramping in T1 and T2, when SCS1=SCS2.

In the above case N1=N2 (i.e. SCS1=SCS2) then T1=T2. In this case the UE can apply any of the following options for adapting transients when transmitting signals S1 and S2 in T1 and T2 respectively. The different options (#1 and #2) are illustrated in FIG. 16 (power ramping in T1 and T2, when SCS1=SCS2) and are described below:

Option 1: The UE adapts transients such that: ramp down due to S1 at the end of T1 is fully done by the UE inside T1 and ramp up due to S2 at the start of T2 is fully done by the UE inside T2.

Option 2: Either the ramp up and down can be shared between T1 and T2. For example the end of T1 contains: part of transient due to ramp down of S1 and also part of transient due to ramp up of S2. Similarly the start of T2 contains part of transient due to ramp up of S2 and also part of transient due to ramp down of S1.

According to one example the UE selects one of the two options based on indication received from the network node. According to another example the UE selects one of the two options based on UE autonomous decision. In this case the UE may also inform the network node about the selected option. According to yet another example the UE selects one of the two options based on pre-defined rule. For example the option to select is linked to the numerology. For example if N1=N2 is above threshold (e.g. SCS>SCS threshold (St)) then the UE selects option 1; otherwise (i.e. if SCS≥St) the UE selects option 2. An example of St=30 KHz. The decision about where to place the transient when SCS1=SCS2 may be based on of any of S1 or S2 contains critical signals, to protect the signals, as mentioned above. The place of the transient may be based on the type of signals transmitted and the location of the respective symbols. If the numerology is the same for S1 and S2 and critical signals are present, the transient may be placed in a data symbol, i.e. a symbol used for transmitting data and not control signaling.

Step-3: In this step, the UE transmits signals (S1 and S2), based on one of the determined ON/OFF masks (M1 and M2), as described in step 2.

In another embodiment a method in a base station or network node of for adaption of UE ON/OFF mask is comprised. The method may comprise the following steps:

Step-1: In this step the network node is configuring a UE with a first signal S1 to be transmitted at time T1 with numerology N1 and a second signal S2 to be transmitted in time T2 with numerology N2.

Step-2: In this step the network node determines an ON/OFF mask (denoted as M1 and M2 respectively) used by the UE for transmission of signals S1 and S2 based on: at least a relation between numerology N1 used by the UE for transmission of S1 in T1 and numerology N2 used by the UE for transmission of S2 in T2. The selection of ON/OFF mask is according to the rules defined in step-2 of the UE-method above.

Step-3: In this step the network node receives signals S1 and S2 from the UE based on the determined ON/OFF masks (M1 and M2) used by the UE transmission of S1 and S2 during T1 and T2 respectively.

The network node further adapts scheduling of signals in uplink by the UE based on the relation between N1 and N2 to be used by the UE for selection of the ON/OFF mask. For example if the selected mask will lead to all transients in the beginning of T2 then the network node avoids scheduling uplink signals in the symbols at the start of T2.

Example Operations

The proposed methods will now be described in more detail referring to FIGS. 17 and 18. It should be appreciated that FIGS. 17 and 18 comprise some operations and modules which are illustrated with a solid border and some operations and modules which are illustrated with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations do not need to be performed in order. Furthermore, it should be appreciated that not all of the operations need to be performed.

Figure 17:
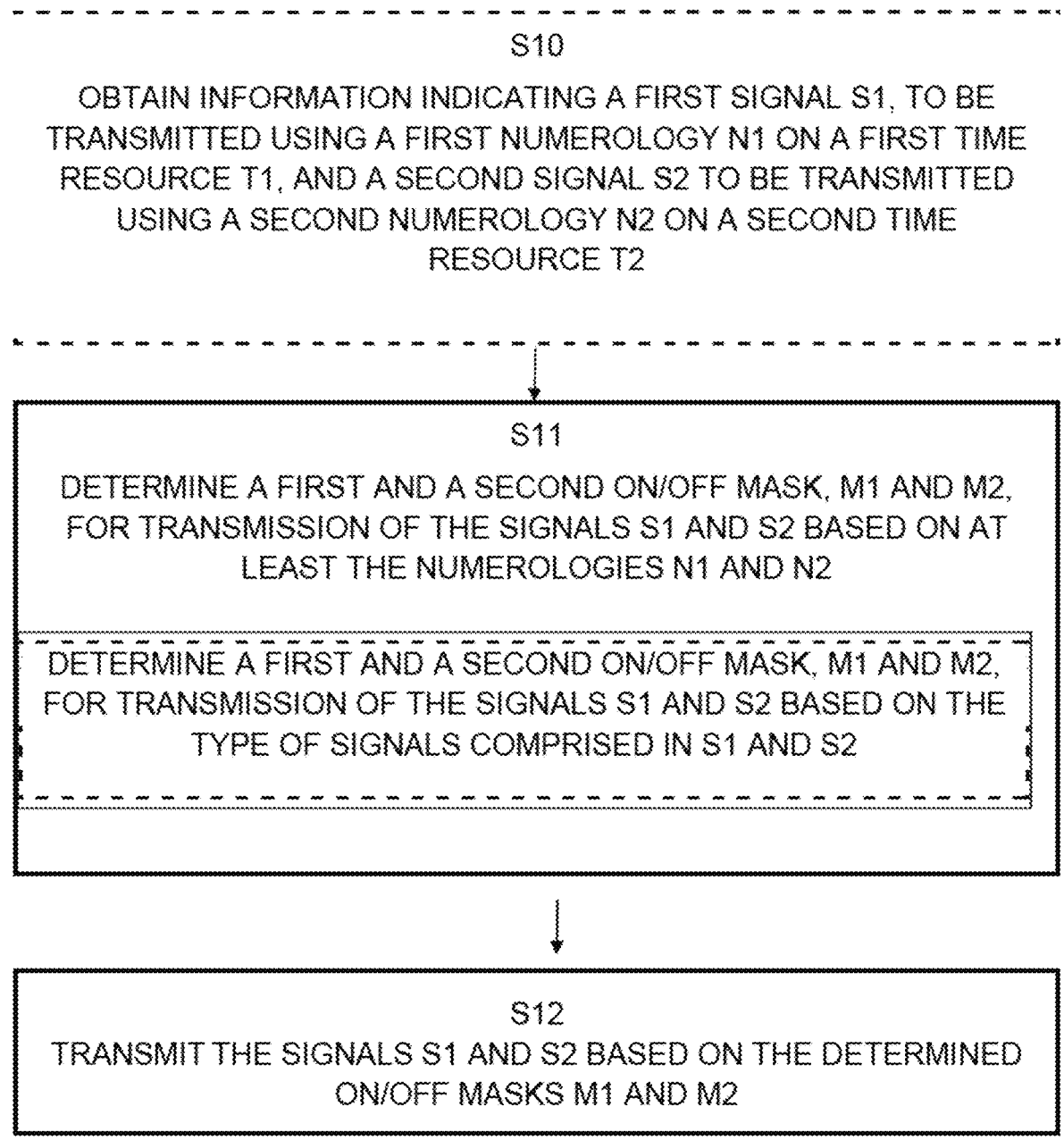
FIG. 17 flowchart of an exemplary process for transmitting a first and a second signal, S1 and S2, using a first and a second numerology, N1 and N2.
Figure 18:
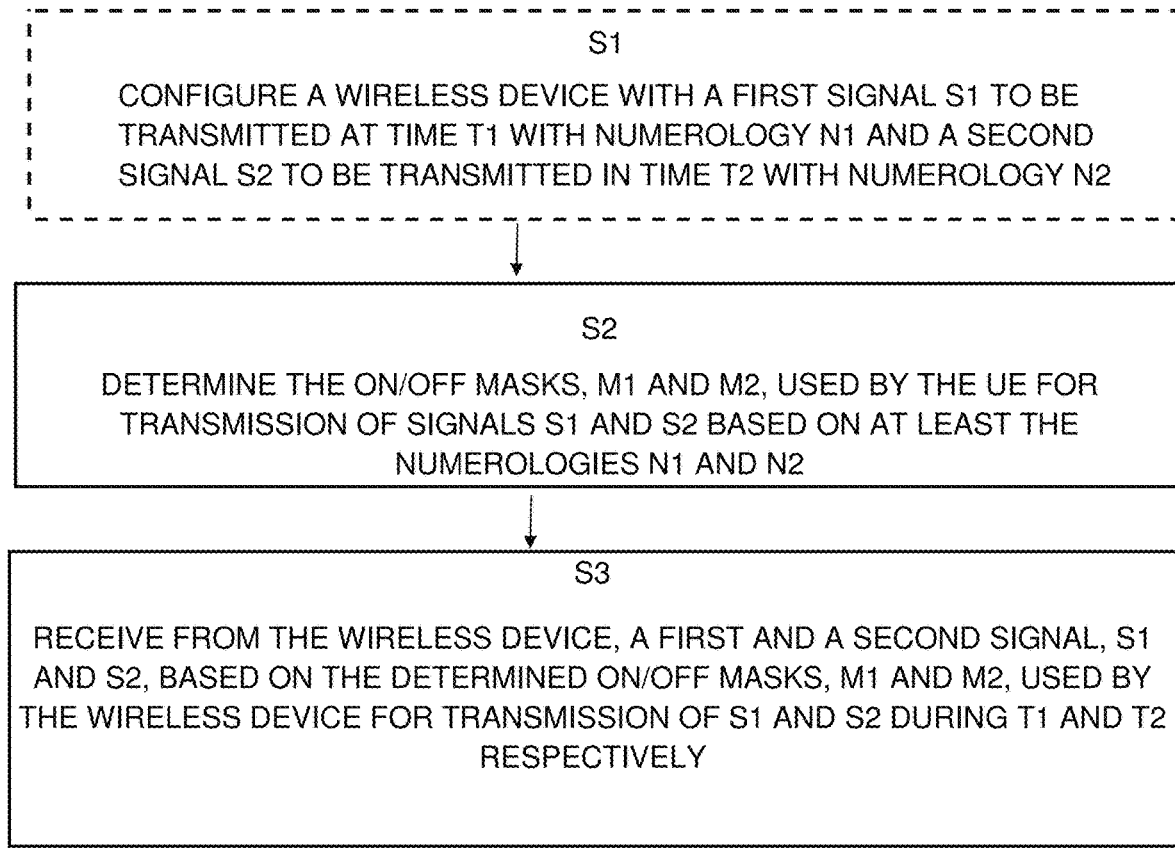
FIG. 18 is a flowchart of an exemplary process for receiving a first and a second signal, S1 and S2, transmitted using a first and a second numerology, N1 and N2, during a first and second time resource, T1 and T2.

FIG. 17 illustrates a method, performed in a wireless device in a wireless communication system, for transmitting a first and a second signal, S1 and S2, using a first and a second numerology, N1 and N2, the method comprising: determining (S11) a first and a second ON/OFF mask, M1 and M2, for transmission of the signals S1 and S2 based on at least the numerologies N1 and N2 (or their corresponding SCS); and transmitting (S12) the signals S1 and S2 based on the determined ON/OFF masks M1 and M2, e.g. using the determined length and location of the transient time between the signals S1 and S2. Thus, when the wireless device shall transmit the signals S1 and S2 in a system where multiple numerologies are present, it can adapt the ON/OFF mask to the used numerologies or subcarrier spacings of said numerologies, hence adapting the location and duration of the transient depending on e.g. the subcarrier spacings of the respective signals. The relation between the numerologies determines which ON/OFF mask is to be used. For example, depending on which numerology has the greater SCS, i.e. shorter symbol duration, the location of the transient may be placed where there is more time duration available. Typically, the signals S1 and S2 are transmitted with distinct output powers, i.e. have different power levels or change in phase, where the transient occurs due to change in phase and the power level of the signals in the useful part is the same.

In one aspect determining a first and a second ON/OFF mask, M1 and M2, based on the numerologies N1 and N2 further comprises determining the first and the second ON/OFF mask, M1 and M2, based on the type of signals comprised in S1 and S2, respectively, and the location of the symbol(s) comprising said signals. Hence, besides numerology and subcarrier spacings, the type of signal included in the transmitted signals S1 and S2, such as the presence and location of a specific type of signal or type of signaling in S1 and S2, where the type of signal present may be a critical signal, such as uplink control information. In one aspect, the presence of signals such as SRS, DMRS and PUCCH, close to the transient location between S1 and S2, e.g. at the end of S1, such as the last symbol(s) of S1, or in the beginning of S2, such as the first symbol(s) of S2, may impact the ON/OFF masks M1 and M2. Hence, the location and/or duration of the transient period between S1 and S2 may be determined to protect these critical signals, and to place the transient period where it has the least impact on these signals.

In one aspect, the method further comprises obtaining (S10) information indicating a first signal S1, to be transmitted using a first numerology N1 on a first time resource T1, and a second signal S2 to be transmitted using a second numerology N2 on a second time resource T2, wherein the obtained (S10) information indicating a first and second signal comprises determining the information autonomously in the wireless device or receiving the information from a network node. The wireless device may thus either receive information from a network node regarding the signals S1 and S2 or may determine the signals in the wireless device. The signals S1 and S2 are transmitted consecutively at time resources T1 and T2 which are adjacent/successive in time, where T2 follows after T1. Between S1 and S2 there is a power transient due to different power levels or phase, hence in the intersection between time resource T1 and T2. The determination of the ON/OFF masks may determine where to put the transient period in view of T1 and T2.

In a further aspect, the determining of a first and a second ON/OFF mask, M1 and M2, for transmission of the signals S1 and S2, based on the numerologies N1 and N2 comprises determining a relation between the numerologies N1 and N2. Each numerology is linked to a frequency subcarrier spacing (SCS) and determining a relation between the numerologies N1 and N2 comprises determining the relation between a first subcarrier spacing (SCS1) of the first numerology N1 and a second subcarrier spacing (SCS2) of the second numerology N2. Depending on which SCS is greater, or if they are equal, as well as if any critical signals are present near the transition between T1 and T2, i.e. end of T1 and beginning of T2, the transient period location may vary.

When the relation between the SCS is determined as SCS1<SCS2 and no critical signals are present in S1 or S2, then the wireless device place all transients caused by transmission of S1 in end of T1 and by transmission of S2 at start of T2, inside T1. When a critical signal is present in the last symbol of S1, then the wireless device places all transients caused by transmission of S1 and by transmission of S2 at start of T2, inside T2. When a critical signal is present in S2, such as in the first symbol of S2, then the wireless device places all transients caused by transmission of S1 and by transmission of S2 at end of T1, inside T1. When multiple critical signals are present in S1, then, if the number of adjacent uplink symbols for transmission of critical signals ≥ threshold (Hs), the wireless device place all transients caused by transmission of S1 and by transmission of S2 at start of T2, inside T2, otherwise at end of T1.

When the relation between the SCS is determined as SCS1>SCS2 and no critical signals are present in S2, then the wireless device place all transients caused by transmission of S1 in end of T1 and by transmission of S2 at start of T2, inside T2. When at least one critical signal is present in both S1 and S2, then the wireless device places all transients caused by transmission of S1 and by transmission of S2 either at end of T1 inside T1, or at start of T2, inside T2, or partly in the end of T1 and start of T2 based on the relevance of the critical signals contained in S1 and S2. When multiple critical signals are present in S1, then the wireless device place all transients caused by transmission of S1 and by transmission of S2 either at end of T1 inside T1.

When the relation between the SCS is determined as SCS1=SCS2 then the UE place all transients caused by transmission of S1 in end of T1 and by transmission of S2 at start of T2, inside T2 or inside T1, or partly inside T1 and partly inside T2. When S1 contains one or more critical signals, then the UE place all transients caused by transmission of S1 and by transmission of S2 at start of T2, inside T2. When S2 contains a critical signal, then the UE place all transients caused by transmission of S1 and by transmission of S2 at end of T1, inside T1. When both S1 and S2 contains at least one critical signal, then the UE place all transients caused by transmission of S1 and by transmission of S2 in a symbol not containing any critical signal. This may for example be a data symbol, i.e. a symbol used for transmitting data and not control information.

A corresponding method, performed in a network node, for receiving a first and a second signal, S1 and S2, will now be described referring to FIG. 18. FIG. 18 illustrates a method for use in a network node in a wireless communication system for receiving a first and a second signal, S1 and S2, (or a first and second transmission S1 and S2) transmitted using a first and a second numerology, N1 and N2, (or corresponding SCS, SC1 and SC2) during a first and second time resource, T1 and T2. The method comprises determining (S2) ON/OFF masks, M1 and M2, (such as location and duration of the transient period between S1 and S2, i.e. between T1 and T2) used by the UE for transmission of signals S1 and S2 based at least on the numerologies N1 and N2, and receiving (S3), from the wireless device, a first and a second signal, S1 and S2, based on the determined ON/OFF masks, M1 and M2, used by the wireless device for transmission of S1 and S2 during T1 and T2 respectively.

In one embodiment the method may further comprise configuring (S1) a wireless device with a first signal S1 to be transmitted at time T1 with numerology N1 and a second signal S2 to be transmitted in time T2 with numerology N2.

In one aspect determining (S2) the ON/OFF masks, M1 and M2, used by the UE for transmission of signals S1 and S2 based on the numerologies N1 and N2 comprises determining at least a relation between numerology N1 used by the UE for transmission of S1 in T1 and numerology N2 used by the UE for transmission of S2 in T2. In one aspect, the network node is a gNB.

In one aspect, determining (S2) the ON/OFF masks, M1 and M2, used by the wireless device for transmission of signals S1 and S2 based on at least the numerologies N1 and N2 comprises determining the ON/OFF masks, M1 and M2, based on the presence and location of critical signals in S1 and/or S2, as described above and below.

Example Node Configurations

Figure 19:
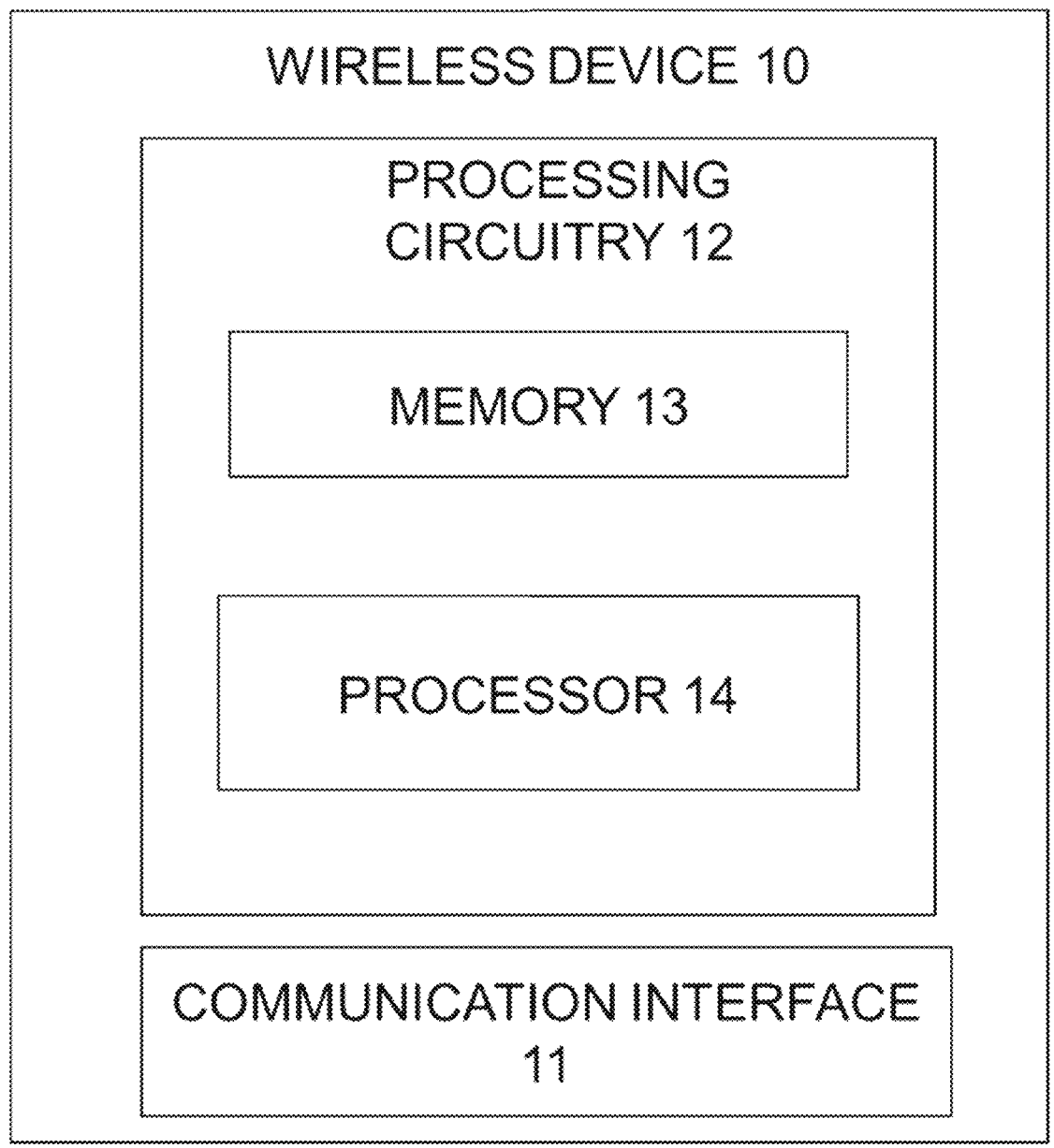
FIG. 19 is a block diagram illustrating a wireless device configured to transmit a first and a second signal, S1 and S2, using a first and a second numerology, N1 and N2.

Turning now to FIG. 19, which is a schematic diagram that illustrates some modules of an example embodiment of a wireless device being configured for transmitting a physical uplink control channel and/or determining a physical uplink control channel structure. The wireless device is configured to implement all aspects of the methods described in relation to FIG. 17. The wireless device 10 comprises a radio communication interface (i/f) 11 configured for communication with a network node. The radio communication interface 11 may be adapted to communicate over one or several radio access technologies. If several technologies are supported, the node typically comprises several communication interfaces, e.g. one WAN or Bluetooth communication interface and one cellular communication interface, including LTE or NR.

The wireless device 10 comprises a controller, CTL, or a processing circuitry 12 that may be constituted by any suitable Central Processing Unit, CPU, microcontroller, Digital Signal Processor, DSP, etc. capable of executing computer program code. The computer program may be stored in a memory, MEM 13. The memory 13 can be any combination of a Read And write Memory, RAM, and a Read Only Memory, ROM. The memory 13 may also comprise persistent storage, which, for example, can be any single one or combination of magnetic memory, optical memory, or solid state memory or even remotely mounted memory. According to some aspects, the disclosure relates to a computer program comprising computer program code which, when executed, causes a wireless device to execute the methods described above and below. According to some aspects the disclosure pertains to a computer program product or a computer readable medium holding said computer program. The processing circuitry may further comprise both a memory 13 storing a computer program and a processor 14, the processor being configured to carry out the method of the computer program.

One embodiment includes a wireless device (10), configured to operate in a wireless communication system (100), configured for transmitting a first and a second signal. S1 and S2, using a first and a second numerology, N1 and N2 to a network node (20), the wireless device (10) comprising a communication interface (11) and processing circuitry (12) configured to cause the wireless device (10) to determine a first and a second ON/OFF mask, M1 and M2, for transmission of the signals S1 and S2 based on the numerologies N1 and N2; and to transmit the signals S1 and S2 based at least on the determined ON/OFF masks M1 and M2. According to some aspects, the processing circuitry 12 is further configured to cause the wireless device 10 to obtain information indicating a first signal S1, to be transmitted using a first numerology N1 on a first time resource T1, and a second signal S2 to be transmitted using a second numerology N2 on a second time resource T2.

According to some aspects, the processing circuitry 12 is further configured to cause the wireless device 10 to determine a first and a second ON/OFF mask, M1 and M2, based on the numerologies N1 and N2 further comprises to determine the first and the second ON/OFF mask, M1 and M2, based on the type of signals comprised in S1 and S2, respectively, and the location of the symbol(s) comprising said signals.

Further, embodiments relating to a host computer and activities therein, is also comprised in the current disclosure. A host computer (or server, or application server), which is under the ownership or control of a service provider, or which is operated by the service provider or on their behalf is connected to the RAN (e.g., cellular network) via the core network.

In one aspect is comprised a user equipment (UE) or wireless device configured to communicate with a base station or network node, the UE comprising a radio interface and processing circuitry configured to: obtain information indicating a first signal S1, to be transmitted using a first numerology N1 on a first time resource T1, and a second signal S2 to be transmitted using a second numerology N2 on a second time resource T2; determine a first and a second ON/OFF mask, M1 and M2, for transmission of the signals S1 and S2 based on the numerologies N1 and N2; and transmit the signals S1 and S2 based on the determined ON/OFF masks M1 and M2.

In a further aspect is comprised a communication system including a host computer comprising: a communication interface configured to receive user data originating from a transmission from a user equipment (UE) to a base station, wherein the UE comprises a radio interface and processing circuitry, the UE's processing circuitry configured to: obtain information indicating a first signal S1, to be transmitted using a first numerology N1 on a first time resource T1, and a second signal S2 to be transmitted using a second numerology N2 on a second time resource T2; determine a first and a second ON/OFF mask, M1 and M2, for transmission of the signals S1 and S2 based on the numerologies N1 and N2; and transmit the signals S1 and S2 based on the determined ON/OFF masks M1 and M2. In one aspect, the communication system further includes the UE. In another aspect, the communication system further includes the base station, wherein the base station comprises a radio interface configured to communicate with the UE and a communication interface configured to forward to the host computer the user data carried by a transmission from the UE to the base station. In a further aspect the processing circuitry of the host computer is configured to execute a host application; and the UE's processing circuitry is configured to execute a client application associated with the host application, thereby providing the user data. Ina a further aspect the processing circuitry of the host computer is configured to execute a host application, thereby providing request data; and the UE's processing circuitry is configured to execute a client application associated with the host application, thereby providing the user data in response to the request data.

In a further embodiment is defined a method implemented in a communication system including a host computer, a base station and a user equipment (UE), the method comprising: at the host computer, receiving user data transmitted to the base station from the UE, wherein the UE obtains information indicating a first signal S1, to be transmitted using a first numerology N1 on a first time resource T1, and a second signal S2 to be transmitted using a second numerology N2 on a second time resource T2, determine a first and a second ON/OFF mask, M1 and M2, for transmission of the signals S1 and S2 based on the numerologies N1 and N2, and transmit the signals S1 and S2 based on the determined ON/OFF masks M1 and M2. In one aspect, the method comprising, at the UE, providing the user data to the base station. The method further comprising: at the UE, executing a client application, thereby providing the user data to be transmitted; and at the host computer, executing a host application associated with the client application. The method further comprising: at the UE, executing a client application; and at the UE, receiving input data to the client application, the input data being provided at the host computer by executing a host application associated with the client application, wherein the user data to be transmitted is provided by the client application in response to the input data. According to some aspects the processing circuitry 12 or the wireless device 10 comprises modules 41-43 configured to perform the methods described above. The modules are illustrated in FIG. 10. The modules are implemented in hardware or in software or in a combination thereof. The modules are according to one aspect implemented as a computer program stored in a memory 13 which run on the processing circuitry 12.

According to some aspects the wireless device 10 or the processing circuitry 12 comprises an information obtainer unit 41 configured to obtain, such as receive, information indicating a first signal S1, to be transmitted using a first numerology N1 on a first time resource T1, and a second signal S2 to be transmitted using a second numerology N2 on a second time resource T2. According to some aspects the wireless device 10 or the processing circuitry 12 comprises a determiner module 42 configured to determine a first and a second ON/OFF mask, M1 and M2, for transmission of the signals S1 and S2 based on the numerologies N1 and N2. According to some aspects the wireless device 10 or the processing circuitry 12 comprises a transmitter module 43 configured to transmit the signals S1 and S2 based on the determined ON/OFF masks M1 and M2.

Figure 20:
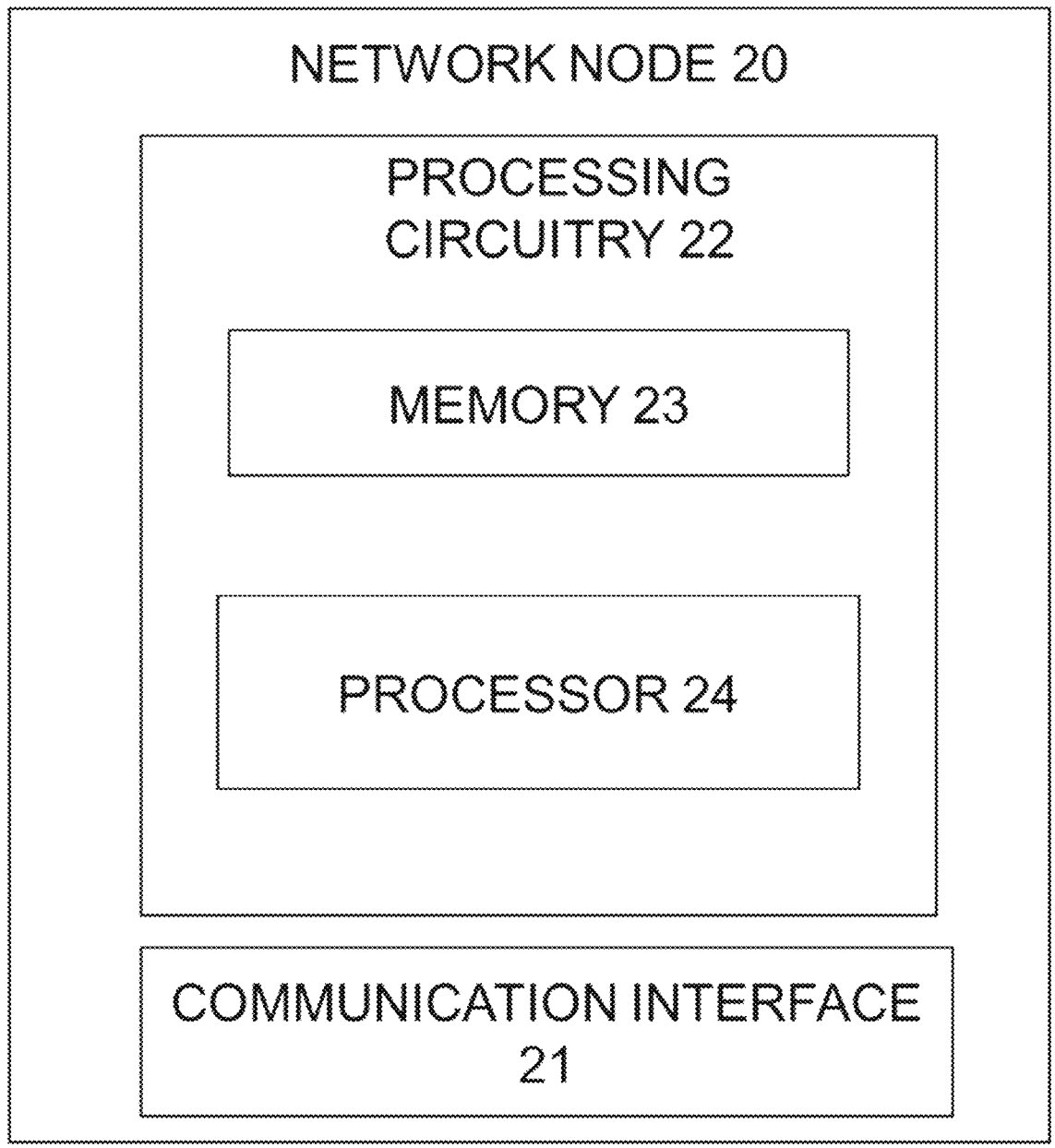
FIG. 20 is a block diagram illustrating a network node configured to receive a first and a second signal, S1 and S2, transmitted using a first and a second numerology, N1 and N2, during a first and second time resource, T1 and T2.

FIG. 20 illustrates an example of a network node 20, which incorporates some of the example embodiments discussed above. FIG. 20 discloses a network node 20 being configured for receiving a first and a second signal, S1 and S2, transmitted using a first and a second numerology, N1 and N2, during a first and second time resource, T1 and T2, from a (one or more) wireless device 10. As shown in FIG. 20, the network node 20 comprises a radio communication interface or radio circuitry 21 configured to receive and transmit any form of communications or control signals within a network. It should be appreciated that the communication interface (radio circuitry) 21 is according to some aspects comprised as any number of transceiving, receiving, and/or transmitting units or circuitry. It should further be appreciated that the radio circuitry 21 can e.g. be in the form of any input/output communications port known in the art. The radio circuitry 21 e.g. comprises RF circuitry and baseband processing circuitry (not shown).

The network node 20 according to some aspects further comprises at least one memory unit or circuitry 23 that is in communication with the radio circuitry 21. The memory 23 can e.g. be configured to store received or transmitted data and/or executable program instructions. The memory 23 is e.g. configured to store any form of contextual data. The memory 23 can e.g. be any suitable type of computer readable memory and can e.g. be of volatile and/or non-volatile type. The network node 20 further comprises processing circuitry 22 which configured to cause the network node 20 to configure a wireless device 10 with a first signal S1 to be transmitted at time T1 with numerology N1 and a second signal S2 to be transmitted in time T2 with numerology N2, determine on ON/OFF masks, M1 and M2, used by the UE for transmission of signals S1 and S2 based on the numerologies N1 and N2, and receive from the wireless device, a first and a second signal, S1 and S2, based on the determined ON/OFF masks, M1 and M2, used by the wireless device for transmission of S1 and S2 during T1 and T2 respectively.

The processing circuitry 22 is e.g. any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but is according to some aspects provided as any number of units or circuitry. The processing circuitry may thus comprise both a memory 23 for storing a computer program and a processor 24, the processor being configured to carry out the method of the computer program.

The controller, CTL, or processing circuitry 22 is according to some aspects capable of executing computer program code. The computer program is e.g. stored in a memory, MEM, 23. The memory 23 can be any combination of a Read And write Memory, RAM, and a Read Only Memory, ROM. The memory 23 in some situations also comprise persistent storage, which, for example, can be any single one or combination of magnetic memory, optical memory, or solid state memory or even remotely mounted memory. It should be appreciated that the processing circuitry need not be provided as a single unit but is according to some aspects provided as any number of units or circuitry. According to some aspects, the disclosure relates to a computer program comprising computer program code which, when executed, causes a network node to execute the methods described above and below.

In one embodiment is comprised a network node (20), configured to operate in a wireless communication system (100), configured for receiving a physical uplink control channel from a wireless device (10), the network node (20) comprising a communication interface (21); and processing circuitry (22) configured to cause the network node (20) to determine on ON/OFF masks, M1 and M2, used by the UE for transmission of signals S1 and S2 based on the numerologies N1 and N2, and to receive from the wireless device, a first and a second signal, S1 and S2, based on the determined ON/OFF masks, M1 and M2, used by the wireless device for transmission of S1 and S2 during T1 and T2 respectively. According to some aspects, the processing circuitry 22 is configured to configure a wireless device with a first signal S1 to be transmitted at time T1 with numerology N1 and a second signal S2 to be transmitted in time T2 with numerology N2.

The wireless device comprises units (41-43) operative to obtain information indicating a first signal S1, to be transmitted using a first numerology N1 on a first time resource T1, and a second signal S2 to be transmitted using a second numerology N2 on a second time resource T2 (41), to determine a first and a second ON/OFF mask, M1 and M2, for transmission of the signals S1 and S2 based on the numerologies N1 and N2 (42), and to transmit the signals S1 and S2 based on the determined ON/OFF masks M1 and M2 (43).

The network node comprises units (51-53) operative to configure a wireless device with a first signal S1 to be transmitted at time T1 with numerology N1 and a second signal S2 to be transmitted in time T2 with numerology N2 (51), to determine on ON/OFF masks, M1 and M2, used by the UE for transmission of signals S1 and S2 based on the numerologies N1 and N2 (52), and to receive from the wireless device, a first and a second signal, S1 and S2, based on the determined ON/OFF masks, M1 and M2, used by the wireless device for transmission of S1 and S2 during T1 and T2 respectively (53). According to some aspects the network node 20 or the processing circuitry 22 comprises modules or units configured to perform the methods described above. The modules or units are implemented in hardware or in software or in a combination thereof.

The content of this disclosure thus enables adaption of the ON/OFF mask, i.e. the length and location of the transient time, for transmission or reception of signals using different numerologies, or in a system where multiple numerologies are present, such as in the radio access technology NR, without degrading critical uplink signals.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/ or other programmable data processing apparatus to produce a machine, such that the instructions, which execute via the processor of the computer and/or other programmable data processing apparatus, create means for implementing the functions/acts specified in the block diagrams and/or flowchart block or blocks.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

According to some aspects is provided a computer program comprising computer program code which, when executed in a wireless device, causes the wireless device to execute the methods in the wireless device described above.

According to some aspects is provided a computer program comprising computer program code which, when executed in a network node, causes the network node to execute the methods in the network node described above.

According to some aspects is provided a carrier containing any one of the computer programs mentioned above, wherein the carrier is one of an electronic signal, optical signal, radio signal, or computer readable storage medium.

Embodiments

1. A method for use in a wireless device in a wireless communication system for transmitting a first and a second signal, S1 and S2, using a first and a second numerology, N1 and N2, the method comprising:
   determining (S11) a first and a second ON/OFF mask, M1 and M2, for transmission of the signals S1 and S2 based on the numerologies N1 and N2; and
   transmitting (S12) the signals S1 and S2 based on the determined ON/OFF masks M1 and M2.

2. The method of embodiment 1 further comprising:
   obtaining (S10) information indicating a first signal S1, to be transmitted using a first numerology N1 on a first time resource T1, and a second signal S2 to be transmitted using a second numerology N2 on a second time resource T2.

3. The method of embodiment 2, wherein the obtained (S10) information indicating a first and second signal comprises determining the information autonomously in the wireless device or receiving the information from a network node.

4. The method of embodiments 1-3, wherein determining (S11) a first and a second ON/OFF mask, M1 and M2, for transmission of the signals S1 and S2 based on the numerologies N1 and N2 comprises determining a relation between the numerologies N1 and N2.

5. The method of embodiment 4, wherein each numerology is linked to a frequency subcarrier spacing (SCS) and determining (S11) a relation between the numerologies N1 and N2 comprises determining the relation between a first subcarrier spacing (SCS1) of the first numerology N1 and a second subcarrier spacing (SCS2) of the second numerology N2.

6. The method of embodiment 5, wherein the relation between the SCS is determined as SCS1<SCS2 then the wireless device place all transients caused by transmission of S1 in end of T1 and by transmission of S2 at start of T2, inside T1.

7. The method of embodiment 5, wherein the relation between the SCS is determined as SCS1>SCS2 then the wireless device place all transients caused by transmission of S1 in end of T1 and by transmission of S2 at start of T2, inside T2.

8. The method of embodiment 5, wherein the relation between the SCS is determined as SCS1=SCS2 then the UE place all transients caused by transmission of S1 in end of T1 and by transmission of S2 at start of T2, inside T2 or inside T1, or partly inside T1 and partly inside T2.

9. The method of any of embodiments 1-8, wherein the used radio access technology is NR.

10. A method for use in a network node in a wireless communication system for receiving a first and a second signal, S1 and S2, transmitted using a first and a second numerology, N1 and N2, during a first and second time resource, T1 and T2, the method comprising:
  determining (S2) ON/OFF masks, M1 and M2, used by the UE for transmission of signals S1 and S2 based on the numerologies N1 and N2;
  receiving (S3), from the wireless device, a first and a second signal, S1 and S2, based on the determined ON/OFF masks, M1 and M2, used by the wireless device for transmission of S1 and S2 during T1 and T2 respectively.

11. The method of embodiment 10 further comprising:
  configuring (S1) a wireless device with a first signal S1 to be transmitted at tune T1 with numerology N1 and a second signal S2 to be transmitted in time T2 with numerology N2.

12. The method of embodiment 10-11, wherein determining (S2) the ON/OFF masks, M1 and M2, used by the UE for transmission of signals S1 and S2 based on the numerologies N1 and N2 comprises determining at least a relation between numerology N1 used by the UE for transmission of S1 in T1 and numerology N2 used by the UE for transmission of S2 in T2.

13. The method of embodiments 10-12, wherein the network node is a gNB.

14. A wireless device (10), configured to operate in a wireless communication system (100), configured for transmitting for transmitting a first and a second signal, S1 and S2, using a first and a second numerology, N1 and N2 to a network node (20), the wireless device (10) comprising:
  a communication interface (11) and
  processing circuitry (12) configured to cause the wireless device (10):
    to determine a first and a second ON/OFF mask, M1 and M2, for transmission of the signals S1 and S2 based on the numerologies N1 and N2; and
    to transmit the signals S1 and S2 based on the determined ON/OFF masks M1 and M2.

15. The wireless device (10) of embodiment 14, wherein the processing circuitry (12) is further configured to:
  obtain information indicating a first signal S1, to be transmitted using a first numerology N1 on a first time resource T1, and a second signal S2 to be transmitted using a second numerology N2 on a second time resource T2.

16. A network node (20), configured to operate in a wireless communication system (100), configured for receiving a physical uplink control channel from a wireless device (10), the network node (20) comprising:
  a communication interface (21); and
  processing circuitry (22) configured to cause the network node (20):
    to determine on ON/OFF masks, M1 and M2, used by the UE for transmission of signals S1 and S2 based on the numerologies N1 and N2; and
    to receive from the wireless device, a first and a second signal, S1 and S2, based on the determined ON/OFF masks, M1 and M2, used by the wireless device for transmission of S1 and S2 during T1 and T2 respectively.

17. The network node (20) of embodiment 33 wherein the processing circuitry (22) is further configured to:
  configure a wireless device with a first signal S1 to be transmitted at time T1 with numerology N1 and a second signal S2 to be transmitted in time T2 with numerology N2.

18. A wireless device (10) configured to:
  obtain information indicating a first signal S1, to be transmitted using a first numerology N1 on a first time resource T1, and a second signal S2 to be transmitted using a second numerology N2 on a second time resource T2;
  determine a first and a second ON/OFF mask, M1 and M2, for transmission of the signals S1 and S2 based on the numerologies N1 and N2; and
  transmit the signals S1 and S2 based on the determined ON/OFF masks M1 and M2.

19. The wireless device (10) of embodiment 35 configured to perform the method of any of embodiments 1-9.

20. A network node (20) configured to:
  configure a wireless device with a first signal S1 to be transmitted at time T1 with numerology N1 and a second signal S2 to be transmitted in time T2 with numerology N2;
  determine on ON/OFF masks, M1 and M2, used by the UE for transmission of signals S1 and S2 based on the numerologies N1 and N2; and
  receive from the wireless device, a first and a second signal, S1 and S2, based on the determined ON/OFF masks, M1 and M2, used by the wireless device for transmission of S1 and S2 during T1 and T2 respectively.

21. The network node (20) of embodiment 37 configured to perform the method of any of embodiments 10-13.

22. A wireless device comprising:
  units (41-43) operative to obtain information indicating a first signal S1, to be transmitted using a first numerology N1 on a first time resource T1, and a second signal S2 to be transmitted using a second numerology N2 on a second time resource T2 (41), to determine a first and a second ON/OFF mask, M1 and M2, for transmission of the signals S1 and S2 based on the numerologies N1 and N2 (42), and to transmit the signals S1 and S2 based on the determined ON/OFF masks M1 and M2 (43).

23. A network node comprising:
  units (51-53) operative to configure a wireless device with a first signal S1 to be transmitted at time T1 with numerology N1 and a second signal S2 to be transmitted in time T2 with numerology N2 (S1), to determine on ON/OFF masks, M1 and M2, used by the UE for transmission of signals S1 and S2 based on the numerologies N1 and N2 (S2), and to receive from the wireless device, a first and a second signal, S1 and S2, based on the determined ON/OFF masks, M1 and M2, used by the wireless device for transmission of S1 and S2 during T1 and T2 respectively (53).

24. A computer program comprising computer program code which, when executed in a wireless device, causes the wireless device to execute the methods according to any of the embodiments 1-9.

25. A computer program comprising computer program code which, when executed in a network node, causes the network node to execute the methods according to any of the embodiments 10-13.

26. A carrier containing the computer program of any of embodiments 24-25, wherein the carrier is one of an electronic signal, optical signal, radio signal, or computer readable storage medium.

The invention claimed is:

1. A method, for use in a wireless device in a wireless communication system, for transmitting a first signal (S1) and a second signal (S2) using a first numerology (N1) and a second numerology (N2), wherein the first and second signals are transmitted with distinct output powers, the method comprising:
   determining a first ON/OFF mask and a second ON/OFF mask for transmission of the first and second signals based on at least the respective numerologies N1 and N2;
   transmitting the first and second signals based on the determined ON/OFF masks; and
   wherein the first ON/OFF mask and second ON/OFF mask define different ramping periods for the first and second numerologies respectively when changing between transmit on and transmit off states.

2. The method of claim 1, wherein the determining the first and a second ON/OFF masks comprises determining the first and the second ON/OFF masks based on a type of signals comprised in the first and/or second signals, respectively, and a location of symbol(s) comprising the signals.

3. The method of claim 1, further comprising obtaining information indicating:
   the first signal S1 to be transmitted using the first numerology N1 on a first time resource (T1); and
   a second signal S2 to be transmitted using the second numerology N2 on a second time resource (T2).

4. The method of claim 3, wherein the obtaining information comprises: determining the information autonomously in the wireless device or receiving the information from a network node.

5. The method of claim 3, wherein the determining the first and a second ON/OFF masks comprises determining a relation between the numerologies N1 and N2 and the presence of critical signals in S1 and S2.

6. The method of claim 5:
   wherein each numerology N1 and N2 is linked to a frequency subcarrier spacing (SCS); and
   wherein the determining the relation between the numerologies N1 and N2 comprises determining the relation between a first subcarrier spacing (SCS1) of the first numerology N1 and a second subcarrier spacing (SCS2) of the second numerology N2 used for transmitting signals S1 and S2 respectively.

7. The method of claim 6, wherein, in response to the relation between the SCS being determined as SCS1<SCS2 and no critical signals are present in S1 or S2, the wireless device:
   places all transients caused by transmission of S1 outside of T1 or in an end of T1; and
   places all transients caused by transmission of S2 at a start of T2, inside T1.

8. The method of claim 6, wherein, in response to the relation between the SCS being determined as SCS1<SCS2 and a critical signal is present in the last symbol of S1, the wireless device places all transients caused by transmission of S1 and by transmission of S2 at start of T2, inside T2.

9. The method of claim 6, wherein, in response to the relation between the SCS being determined as SCS1<SCS2 and a critical signal is present in S2, the wireless device place all transients caused by transmission of S1 and by transmission of S2 at end of T1, inside T1.

10. The method of claim 6, wherein, in response to the relation between the SCS being determined as SCS1<SCS2 and multiple critical signals are present in S1, then, if the number of adjacent uplink symbols for transmission of critical signals a threshold, the wireless device place all transients caused by transmission of S1 and by transmission of S2 at start of T2, inside T2, otherwise at end of T1.

11. The method of claim 6, wherein, in response to the relation between the SCS being determined as SCS1>SCS2 and no critical signals are present in S2, the wireless device places all transients caused by transmission of S1 and by transmission of S2 at start of T2, inside T2.

12. The method of claim 6, wherein, in response to the relation between the SCS being determined as SCS1>SCS2 and at least one critical signal is present in both S1 and S2, the wireless device place all transients caused by transmission of S1 and by transmission of S2 either at end of T1 inside T1, or at start of T2, inside T2, or partly in the end of T1 and start of T2 based on the relevance of the critical signals contained in S1 and S2.

13. The method of claim 12, wherein, when multiple critical signals are present in S1, the wireless device place all transients caused by transmission of S1 and by transmission of S2 either at end of T1, or inside T1.

14. The method of claim 6, in response to the relation between the SCS being determined as SCS1=SCS2, the wireless device:
   places all transients caused by transmission of S1 in end of T1; and
   places all transients caused by transmission of S2 at start of T2, inside T2, or inside T1, or partly inside T1 and partly inside T2.

15. The method of claim 6, wherein, in response to the relation between the SCS being determined as SCS1=SCS2 and S1 containing one or more critical signals, the wireless device places all transients caused by transmission of S1 and by transmission of S2 at start of T2, inside T2.

16. The method of claim 6, wherein, in response to the relation between the SCS being determined as SCS1=SCS2 and S2 containing a critical signal, the wireless device places all transients caused by transmission of S1 and by transmission of S2 at end of T1, inside T1.

17. The method of claim 6, wherein, in response to the relation between the SCS being determined as SCS1=SCS2 and both S1 and S2 containing at least one critical signal, the wireless device places all transients caused by transmission of S1 and by transmission of S2 in a symbol not containing any critical signal.

18. A method, for use in a network node in a wireless communication system, for receiving, from a wireless device, a first signal (S1) and a second signal (S2) transmitted using a first numerology (N1) and a second numerology (N2) during a first time resource (T1) and second time resource (T2), wherein S1 and S2 are transmitted using distinct output powers, the method comprising:
   determining a first ON/OFF mask (M1) and a second ON/OFF mask (M2), used by the wireless device for transmission of signals S1 and S2, based on at least the numerologies N1 and N2;
   receiving, from the wireless device, the first signal S1 and the second signal S2, based on the determined ON/OFF masks M1 and M2, used by the wireless device for transmission of S1 and S2 during T1 and T2, respectively; and
   wherein the first ON/OFF mask and second ON/OFF mask define different ramping periods for the first and second numerologies respectively when changing between transmit on and transmit off states.

19. The method of claim 18, further comprising configuring the wireless device with:
- the first signal S1 to be transmitted at time T1 with numerology N1; and
- the second signal S2 to be transmitted in time T2 with numerology N2.

20. The method of claim 18, wherein the determining comprises determining at least a relation between numerology N1, used by the wireless device for transmission of S1 in T1, and numerology N2, used by the UE for transmission of S2 in T2.

21. The method of claim 18, wherein the determining comprises determining the ON/OFF masks M1 and M2 based on a presence and location of critical signals in S1 and/or S2.

22. A wireless device, configured to operate in a wireless communication system, and configured for transmitting a first signal (S1) and a second signal (S2) using a first numerology (N1) and a second numerology (N2), wherein the signals S1 and S2 are transmitted with distinct output powers to a network node, the wireless device comprising:
- a communication interface; and
- processing circuitry configured to cause the wireless device to:
  - determine a first ON/OFF mask (M1) and a second ON/OFF mask (M2), for transmission of the signals S1 and S2, based on at least the numerologies N1 and N2;
  - transmit the signals S1 and S2 based on the determined ON/OFF masks M1 and M2; and
  - wherein the first ON/OFF mask and second ON/OFF mask define different ramping periods for the first and second numerologies respectively when changing between transmit on and transmit off states.

23. The wireless device of claim 22, wherein the processing circuitry is configured to determine the first and a second ON/OFF masks M1 and M2 further based on a type of signals comprised in S1 and S2, respectively, and the location of symbol(s) comprising the signals.

24. The wireless device of claim 22, wherein the processing circuitry is further configured to obtain information indicating:
- a first signal S1, to be transmitted using a first numerology N1 on a first time resource T1; and
- a second signal S2 to be transmitted using a second numerology N2 on a second time resource T2.

25. A network node, configured to operate in a wireless communication system, and configured to receive a first signal (S1) and a second signal (S2) transmitted using a first numerology (N1) and a second numerology (N2) during a first time resource (T1) and second time resource (T2), wherein S1 and S2 are transmitted using distinct output powers from a wireless device, the network node comprising:
- a communication interface; and
- processing circuitry configured to cause the network node to:
  - determine a first ON/OFF mask (M1) and a second ON/OFF mask (M2), used by the wireless device for transmission of signals S1 and S2, based on at least the numerologies N1 and N2;
  - receive, from the wireless device, the first and a second signals S1 and S2, based on the determined ON/OFF masks M1 and M2, used by the wireless device for transmission of S1 and S2 during T1 and T2, respectively; and
  - wherein the first ON/OFF mask and second ON/OFF mask define different ramping periods for the first and second numerologies respectively when changing between transmit on and transmit off states.

26. The network node of claim 25, wherein the processing circuitry is further configured to configure the wireless device with:
- the first signal S1 to be transmitted at time T1 with numerology N1; and
- the second signal S2 to be transmitted in time T2 with numerology N2.

* * * * *